(12) United States Patent
Ono et al.

(10) Patent No.: US 10,754,435 B2
(45) Date of Patent: *Aug. 25, 2020

(54) INFORMATION PROCESSING APPARATUS AND METHOD, AND PROGRAM

(71) Applicant: SONY CORPORATION, Tokyo (JP)

(72) Inventors: Kouichirou Ono, Tokyo (JP); Yoichiro Sako, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/197,804

(22) Filed: Nov. 21, 2018

(65) Prior Publication Data

US 2019/0155395 A1    May 23, 2019

Related U.S. Application Data

(63) Continuation of application No. 14/357,865, filed as application No. PCT/JP2013/074464 on Sep. 11, 2013, now Pat. No. 10,168,784.

(30) Foreign Application Priority Data

Sep. 20, 2012 (JP) ................................. 2012-207206

(51) Int. Cl.
*G06F 3/01* (2006.01)
*G06F 3/042* (2006.01)
(Continued)

(52) U.S. Cl.
CPC .............. *G06F 3/017* (2013.01); *G06F 3/044* (2013.01); *G06F 3/0425* (2013.01);
(Continued)

(58) Field of Classification Search
CPC ..................... G06F 3/017; G06F 3/0425–0426
See application file for complete search history.

(56) References Cited

U.S. PATENT DOCUMENTS 10,168,784 B2 * 1/2019 Ono ....................... G06F 3/0425
2006/0284837 A1 * 12/2006 Stenger .............. G06K 9/00375
345/156

(Continued)

FOREIGN PATENT DOCUMENTS

JP          08-089346         4/1996
JP          2005-174356       6/2005

(Continued)

*Primary Examiner* — Hang Lin
(74) *Attorney, Agent, or Firm* — Paratus Law Group, PLLC

(57) ABSTRACT

The present technology relates to information processing apparatus and method, and a program, which are capable of presenting an operation input unit in a position in which a user easily performs an input operation. An imaging unit captures an image of a vicinity of a display unit. A hand recognition unit recognizes a hand by extracting a hand image obtained by capturing a hand, based on feature information of the hand, from the image captured by the imaging unit. The hand position detection unit specifies a real position on a display unit from information on a position in an image in which the hand image is present. A display control unit for an operation input unit displays an operation input unit in a position on the display unit which is specified based on the position of the hand detected by the hand position detection unit.

9 Claims, 21 Drawing Sheets

(51) Int. Cl.
  *G06F 3/044*   (2006.01)
  *G06F 3/0488*  (2013.01)
  *G06K 9/00*    (2006.01)
  *G06K 9/62*    (2006.01)

(52) U.S. Cl.
  CPC ........ *G06F 3/0426* (2013.01); *G06F 3/04886* (2013.01); *G06K 9/00355* (2013.01); *G06K 9/6202* (2013.01)

(56) References Cited

U.S. PATENT DOCUMENTS

| | | | | |
|---|---|---|---|---|
| 2008/0141181 | A1* | 6/2008 | Ishigaki | G06F 3/011 |
| | | | | 715/863 |
| 2008/0163131 | A1* | 7/2008 | Hirai | G06F 3/0425 |
| | | | | 715/863 |
| 2013/0249786 | A1* | 9/2013 | Wang | G06T 7/74 |
| | | | | 345/156 |
| 2014/0009403 | A1* | 1/2014 | Tremblay | G06F 3/04886 |
| | | | | 345/173 |

FOREIGN PATENT DOCUMENTS

| | | |
|---|---|---|
| JP | 2006-350434 | 12/2006 |
| JP | 2009-301094 | 12/2009 |
| WO | WO2006/104132 | 10/2006 |

\* cited by examiner

INFORMATION PROCESSING APPARATUS AND METHOD, AND PROGRAM

CROSS REFERENCE TO PRIOR APPLICATION

This application is a continuation of U.S. patent application Ser. No. 14/357,865 (filed on May 13, 2014), which is a National Stage Patent Application of PCT International Patent Application No. PCT/JP2013/074464 (filed on Sep. 11, 2013) under 35 U.S.C. § 371, which claims priority to Japanese Patent Application No. JP2012-207206 (filed on Sep. 20, 2012), which are all hereby incorporated by reference in their entirety.

TECHNICAL FIELD

The present technology relates to information processing apparatus and method, and a program, and particularly to information processing apparatus and method, and a program, which are capable of reducing an effort required for an operation input by presenting an operation input unit in a position in which a user easily performs an input operation.

BACKGROUND ART

An operation input unit represented by a kind of a keyboard in a personal computer has been placed and used in a position in which a user uses it up until now.

However, although using the keyboard being placed on a desk is convenient during use, while the personal computer is not used, a space on the desk capable of being most conveniently used is wastefully occupied by the keyboard.

Therefore, a technology is proposed in which an entire desk is made of a touch panel, while the keyboard is displayed only when required, and the display is erased when no longer required, thereby allowing the space in which the keyboard has been displayed to be used for other work (see PTL 1).

CITATION LIST

Patent Literature

PTL 1: Japanese Unexamined Patent Application Publication No. 08-089346

SUMMARY OF TECHNOLOGY

Technical Problem

As described above, in the technology of PTL 1, it is possible to use a space which has once been set, for a keyboard or for other purposes.

However, since the display position of the keyboard is fixed, if the position of the user relative to the desk changes, the keyboard to be displayed is not necessarily displayed in a convenient position. In other words, when a table of a rectangular shape is made of a touch panel, if it is assumed that the user normally sits in a position corresponding to a specific side of the rectangular shape to use the keyboard, the keyboard may be displayed in a region close to the position corresponding to the specific side as necessary. However, even if the position in which the user sits is, for example, the position corresponding to an opposite side to the specific side relative to the desk, the keyboard is displayed in the vicinity of the position corresponding to the specific side as necessary, and thus the keyboard may not necessarily be displayed in a convenient position for the user sitting in the position corresponding to the opposite side.

The present technology is made in view of such circumstances, and, in particular, is intended to allow a user to perform an input operation with ease without the user being aware of the position in which an operation input unit is present, by detecting a position of a hand of a person who is the user and presenting the operation input unit depending on the detected position of the hand.

Solution to Problem

The present technology provides an information processing apparatus including: a presentation unit that presents various pieces of information; a hand position detection unit that detects a position of a hand; and a presentation control unit for an operation input unit that presents the operation input unit within the presentation unit according to the position of the hand detected by the hand position detection unit.

The present technology may further include an imaging unit that captures an image; and a hand image recognition unit that recognizes a hand image including images of the hand, based on information on the image captured by the imaging unit, wherein the hand position detection unit detects the position of the hand by detecting a position of the hand image which is recognized by the hand image recognition unit, among images captured by the imaging unit.

The present technology may further include a hand shape pattern storage unit that stores hand shapes including shapes of a plurality of hands as hand shape patterns; and a hand shape matching degree calculation unit that calculates a hand shape matching degree between a hand shape region in which a hand shape is present among hand images which are recognized as images of the hand by the hand image recognition unit from the images and the hand shape pattern which is stored in the hand shape pattern storage unit, wherein the hand position detection unit detects the position of the hand, based on the hand shape pattern having a maximum hand shape matching degree which is calculated by the hand shape matching degree calculation unit.

In the present technology, when the hand shape matching degree of the position of the hand detected by the hand position detection unit is greater than a predetermined value, the presentation control unit for an operation input unit presents an operation input unit for operating with the hand, within the presentation unit according to the detected position of the hand.

The present technology may further include a hand shape candidate extraction unit that extracts, as a candidate, a hand shape pattern having a size substantially equal to a size of the hand shape region in which the hand shape is present, among the hand images recognized as the image of the hand by the hand image recognition unit from the images, among the hand shape patterns stored in the hand shape pattern storage unit; a hand shape moving unit that moves the hand shape pattern extracted by the hand shape candidate extraction unit while changing a position of the hand shape pattern at a predetermined interval within the hand shape region; and a hand shape rotation unit that rotates the hand shape pattern extracted by the hand shape candidate extraction unit by a predetermined angle, wherein the hand shape matching degree calculation unit calculates the hand shape matching degree between the hand shape pattern extracted by the hand shape candidate extraction unit and the hand shape region among the hand images, while changing the hand shape pattern through moving by the hand shape moving unit and rotating by the hand shape rotation unit.

The present technology may further include a part shape pattern storage unit that stores part shape patterns including shapes of parts of the hand; a part shape matching degree calculation unit that calculates a part shape matching degree between a part shape region including the shapes of parts of the hand, among images of a part of the hand which are recognized as the image of a part of the hand by the hand image recognition unit from the image, and the part shape pattern stored in the part shape pattern storage unit; and a part position detection unit that detects a position of a part of the hand based on a part shape pattern having a maximum part shape matching degree calculated by the part shape matching degree calculation unit.

In the present technology, when the hand shape matching degree of the position of the hand detected by the hand position detection unit is not greater than a predetermined value, if the part shape matching degree calculated by the part shape matching degree calculation unit in the position of the part shape detected by the part position detection unit is greater than a predetermined value, the presentation control unit for an operation input unit presents an operation input unit for operating with a part of the hand, within the presentation unit according to the detected position of the part shape of the hand.

The present technology may further include a part shape candidate extraction unit that extracts, as a candidate, a part shape pattern having a size substantially equal to a size of the part shape region in which the part shape is present, among the images of a part of the hand recognized as the image of a part of the hand by the hand image recognition unit from the images, among the part shape patterns stored in the part shape pattern storage unit; a part shape moving unit that moves the part shape pattern extracted by the part shape candidate extraction unit while changing a position of the part shape pattern at a predetermined interval within the part shape region; a part shape rotation unit that rotates the part shape pattern extracted by the part shape candidate extraction unit by a predetermined angle; and a part shape matching degree calculation unit that calculates a part shape matching degree between the part shape pattern extracted by the part shape candidate extraction unit and the part shape region, while changing the part shape pattern through moving by the part shape moving unit and rotating by the part shape rotation unit.

The part of the hand may include at least one of a thumb, an index finger, a middle finger, a ring finger, and a little finger.

The information processing apparatus may include a hand gesture recognition unit that recognizes a gesture of the hand, wherein the presentation control unit for an operation input unit presents an operation input unit associated with the gesture, within the presentation unit according to the position of the hand detected by the hand position detection unit.

Another concept of the present technology is an information processing method including the steps of: a hand position detection process of detecting a position of a hand; and a presentation control process for an operation input unit of presenting an operation input unit within a presentation unit that presents various pieces of information according to the position of the hand detected in the hand position detection process.

Still another concept of the present technology is a program causing a computer to execute a process including: a hand position detection step of detecting a position of a hand; and a presentation control step for an operation input unit of presenting an operation input unit within a presentation unit that presents various pieces of information according to the position of the hand detected in the hand position detection step.

In one concept of the present technology, the position of the hand is detected, and the operation input unit is presented within a presentation unit that presents various pieces of information according to the detected position of the hand.

The information processing apparatus of one concept of the present technology may be an independent apparatus, or may be a block for executing an information process.

Advantageous Effects of Invention

According to the present technology, it is possible to present an operation input unit in a position in which a user may easily operate the operation input unit.

BEST MODE FOR CARRYING OUT THE INVENTION

Hereinafter, modes for carrying out the technology (hereinafter, referred to as "embodiment") will be described. In addition, a description will be made in the following order.

1. First embodiment (an example of specifying a position of a user's hand with an image captured by imaging unit)
2. Second embodiment (an example of specifying a position of a user's hand by a touch panel)
3. Third embodiment (an example of implementing a display unit by a projection plane projected by a projection unit)
4. Fourth embodiment (an example of presenting an operation input unit according to a position and a size of a user's hand)
5. Fifth embodiment (an example of presenting an operation input unit corresponding to a size, a position and an angle of a part of a user's hand)
6. Sixth embodiment (an example of switching a presentation of an operation input unit by a gesture of a user's hand)

1. First Embodiment

[External Configuration Example of Information Processing System in Case of Specifying Position of a User's Hand Based on Image Captured by Camera]

Figure 1:
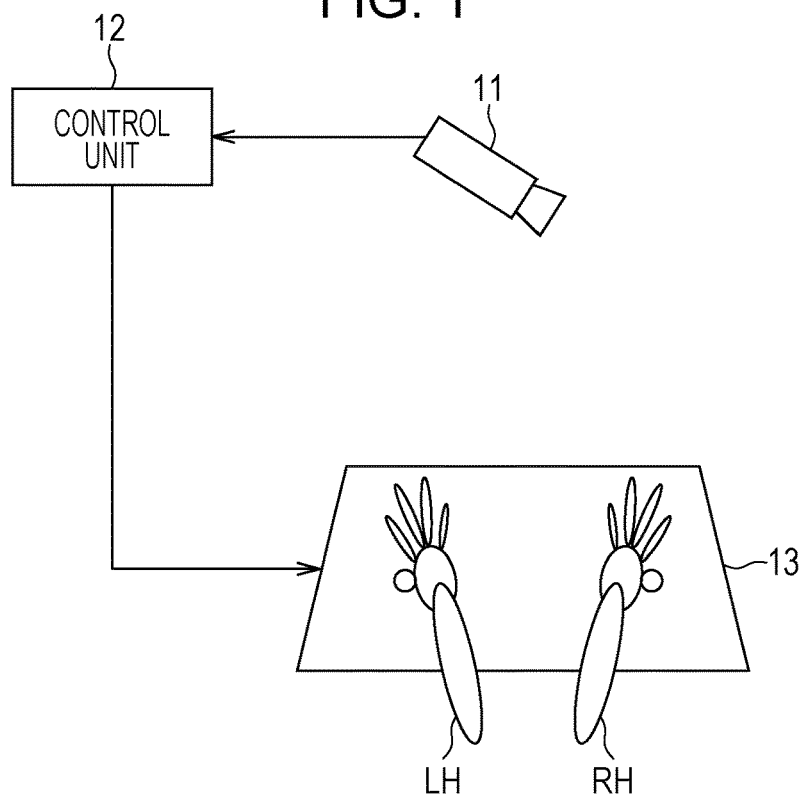
FIG. 1 is a diagram showing an external configuration example of a first embodiment of an information processing system to which the present technology is applied.

FIG. 1 shows an external configuration example of an embodiment of an information processing system to which the present technology is applied. The information processing system of FIG. 1 displays an operation input unit as a display unit 13 configured on a desk, and performs a process based on various pieces of information which are input by a user operating the operation input unit with the fingers of the hand on the display unit 13 so as to display a processing result on the display unit 13.

[Configuration Example of Information Processing System of FIG. 1]

Figure 2:
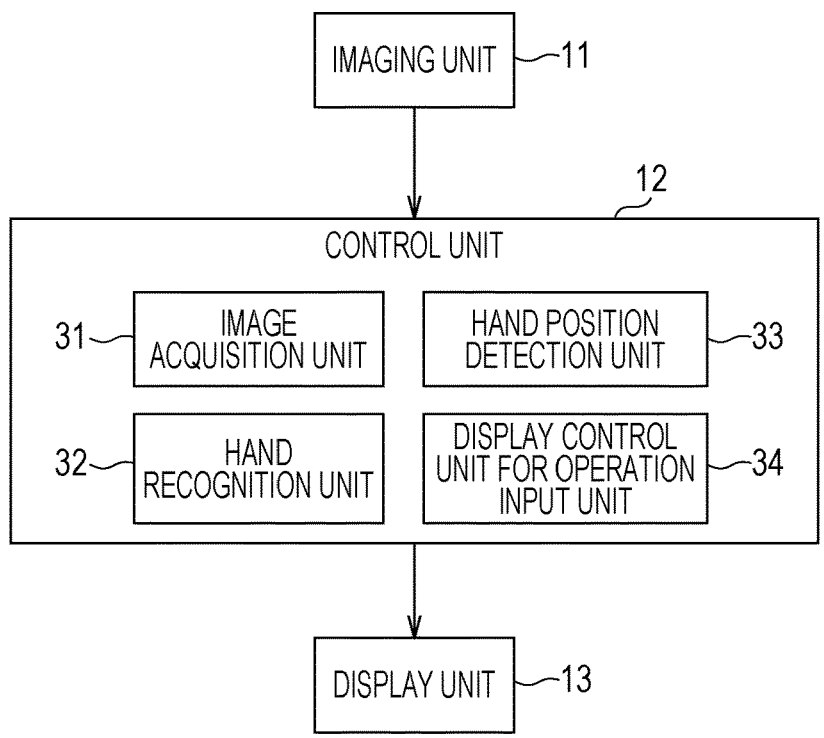
FIG. 2 is a diagram showing a configuration example of the information processing system of FIG. 1.

Next, referring to FIG. 2, a configuration example of implementing the information processing system of FIG. 1 will be described. The information processing system of FIG. 1 includes an imaging unit 11, a control unit 12, and a display unit 13. Further, the information processing system of FIG. 1 may be configured integrally with, for example, an intelligent desk, or the like, and in this case, the information processing system is an information processing apparatus. Accordingly, although the information processing system is employed here, the information processing apparatus may be employed.

The imaging unit 11 is an imaging element made from a Complementary Metal Oxide Semiconductor (CMOS) or a Charge Coupled Device (CCD), and captures an image mainly in the vicinity of the display unit 13 so as to supply the captured image to the control unit 12. The control unit 12 displays the operation input unit in a suitable position relative to a position at which the user's hand is present, on the image displayed by the display unit 13, from a positional relationship between the display unit 13 made from a Liquid Crystal Display (LCD) or an organic Electro-Luminescence (EL) and the image of the user's hand, based on the image supplied from the imaging unit 11.

More specifically, the control unit 12 includes an image acquisition unit 31, a hand recognition unit 32, a hand position detection unit 33, and a display control unit 34 for an operation input unit. The image acquisition unit 31 acquires images captured by the imaging unit 11. The hand recognition unit 32 recognizes a hand image including regions, onto which the user's hand is projected, in an image, from the image acquired by the image acquisition unit 31, based on feature information of a hand such as a skin color, a presence or absence of a finger and a nail. More specifically, the hand recognition unit 32, as shown in FIG. 1, recognizes a hand image region, onto which the left hand LH and the right hand RH of the user are projected, in the captured image, from feature information of a hand.

The hand position detection unit 33 detects a position at which the user's hand is present, relative to the display unit 13, from the information in the image, based on the information of the hand image recognized by the hand recognition unit 32. The display control unit 34 for an operation input unit controls the display of the operation input unit on the display unit 13, based on the information on the position relative to the display unit 13 detected by the hand position detection unit 33. Further, the operation input unit displayed on the display unit 13 is, specifically, operation buttons, a keyboard or the like, and the operation state is recognized by the image captured by the imaging unit 11. In other words, the presence or absence of an input to the operation input unit is recognized by recognizing which finger moves relative to the operation input unit displayed on the display unit 13, based on the hand image recognized by the hand recognition unit 32.

The display unit 13, as shown in FIG. 1, is configured to be displayed on a desk, and displays (presents) the operation input unit according to the position of the user's hand at the same time. Further, although FIG. 1 shows an example in which the display unit 13 is present on the desk, the display unit 13 is not necessarily required to be present on a desk, and the display unit 13 may be configured in an approximately vertical direction with respect to the a floor surface, similarly to a general television receiver.

[Display Process of Operation Input Unit by Information Processing System of FIG. 1]

Figure 3:
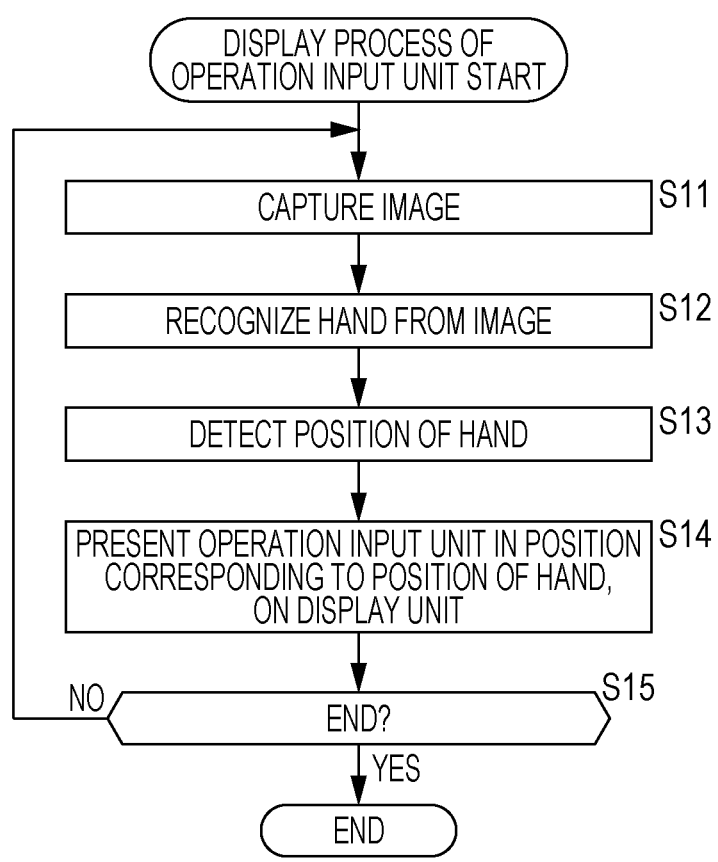
FIG. 3 is a flowchart describing a display process of an operation input unit in the information processing system of FIG. 1.

Next, referring to a flowchart of FIG. 3, a display process of an operation input unit in the information processing system of FIG. 1 will be described.

In step S11, the imaging unit 11 captures an image of the vicinity of the display unit 13 configured on a desk, and supplies the captured image to the control unit 12. The image acquisition unit 31 of the control unit 12 acquires an image of the vicinity of the display unit 13 configured on the desk captured by the imaging unit 11.

In step S12, the hand recognition unit 32 recognizes the hand image by feature information of the hand, from the image of the vicinity of the display unit 13 configured on the desk acquired by the image acquisition unit 31. In other words, the feature information of the hand is information such as a skin color, and a presence or absence of a finger and a nail. The hand recognition unit 32 searches for a region by comparing such feature information of the hand within the image, and recognizes the searched for region as the hand image.

In step S13, the hand position detection unit 33 detects the position of the hand image recognized by the hand recognition unit 32, in the image acquired by the image acquisition unit 31, and detects the position in the image of the detected hand image as the position of the hand.

In step S14, the display control unit 34 for an operation input unit displays (presents) the operation input unit in a position on the display unit 13 corresponding to information on the position of the hand detected by the hand position detection unit 33. In other words, as shown in FIG. 1, when it is recognized that the left hand LH and the right hand RH are present on the display unit 13, the operation input unit is displayed under the palm of each of the left hand LH and the right hand RH or in the position in the vicinity thereof on the display unit 13.

Through the process described above, as long as the left hand LH and the right hand RH of the user are present in the vicinity of the display unit 13 configured on a desk, it is possible to present the operation input unit including a keyboard, operation buttons, or the like in the nearest position without there being awareness of the positions of the left hand LH and the right hand RH. As a result, since the operation input unit is displayed in close proximity to the left hand LH and the right hand RH simply by putting the left hand LH and right hand RH in a certain position on the display unit 13 or placing them within a certain space on the desk configured by the display unit 13, it is possible to perform an operation input while minimizing the movement distances of the left hand LH and the right hand RH when the user attempts to input certain information. Further, when the left hand LH and the right hand RH are present above a desk, that is, the display unit 13, it is possible to display the operation input unit immediately below a palm, thereby allowing the operation input to be completed simply by moving the fingers when the operation input is performed.

2. Second Embodiment

[External Configuration Example of Information Processing System in Case of Specifying Position of User's Hand by Touch Panel]

Although the foregoing describes an example in which the positions of the left hand LH and the right hand RH of the user on the display unit 13 are captured by the imaging unit 11, the positions of the left hand LH and the right hand RH are specified based on the captured image, and operation input units of the left hand LH and the right hand RH are displayed in positions on the display unit 13 corresponding to the specified positions of the hands, as long as the position of the hand can be specified, the position of the hand may be specified by a method other than a method using the image captured by imaging unit 11.

Therefore, next, referring to FIG. 4, as a method of specifying the position of the hand, a configuration example of an information processing system using a touch panel, instead of the display unit 13, will be described.

Figure 4:
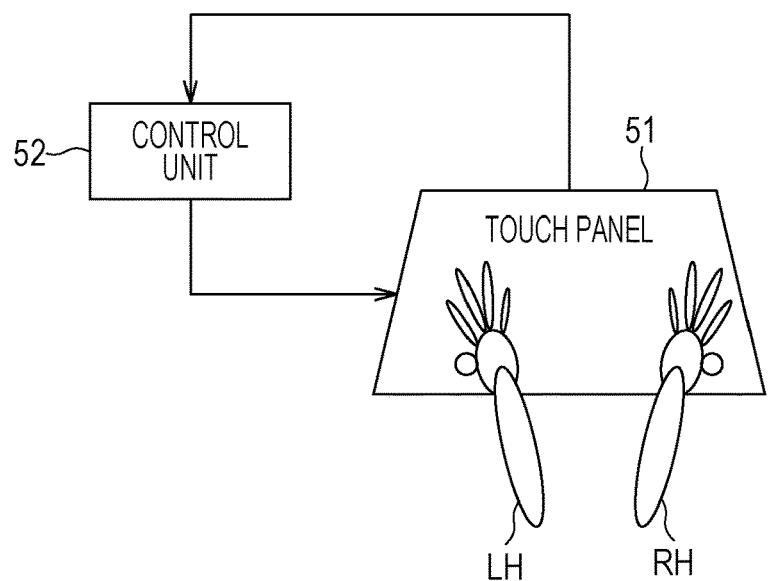
FIG. 4 is a diagram showing an external configuration example of a second embodiment of an information processing system to which the present technology is applied.

In other words, in an information processing system of FIG. 4, instead of the display unit 13 of FIG. 1, a touch panel 51 configured on a desk is provided, the imaging unit 11 is omitted, and a control unit 52 is provided instead of the control unit 12.

[Configuration Example of Information Processing System of FIG. 4]

Next, referring to FIG. 5, the configuration example of the information processing system of FIG. 4 will be described. The touch panel 51 includes a display unit 71 corresponding to the display unit 13 and a contact detection unit 72 that detects an operation input performed by the touch panel 51 being touched.

The contact detection unit 72 detects which position of the surface of the touch panel 51 is touched by detecting a change in capacitance, for example, of a surface configuring the display unit 71 which changes due to contact of the user's hand, and supplies the detected position together with information on the capacitance at this time as a contact detection result to the control unit 52.

The control unit 52 includes a contact detection result acquisition unit 91, a hand recognition unit 92, a hand position detection unit 93, and a display control unit 94 for an operation input unit. The contact detection result acquisition unit 91 acquires information on the contact detection result which is supplied from the touch panel 51 and indicates which position of the surface configuring the display unit 71 of the touch panel 51 is touched.

The hand recognition unit 92 searches for a result of contact, which is regarded as contact by the human's hand, on the surface of the display unit 71, from information indicating the change in capacitance included in the contact detection result acquired by the contact detection result acquisition unit 91, and if there is a searched for contact result, it is recognized that the hand is present at the contact position.

The hand position detection unit 93 detects a position at which the user's hand is present, relative to the display unit 71 on the touch panel 51, based on the information on the position of the hand recognized by the hand recognition unit 92. The display control unit 94 for an operation input unit basically has the same functions as the display control unit 34 for an operation input unit, and controls the display (presentation) of the operation input unit on the display unit 71 based on the information on the position relative to the display unit 71 detected by the hand position detection unit 93.

[Display Process of Operation Input Unit by Information Processing System of FIG. 4]

Figure 6:
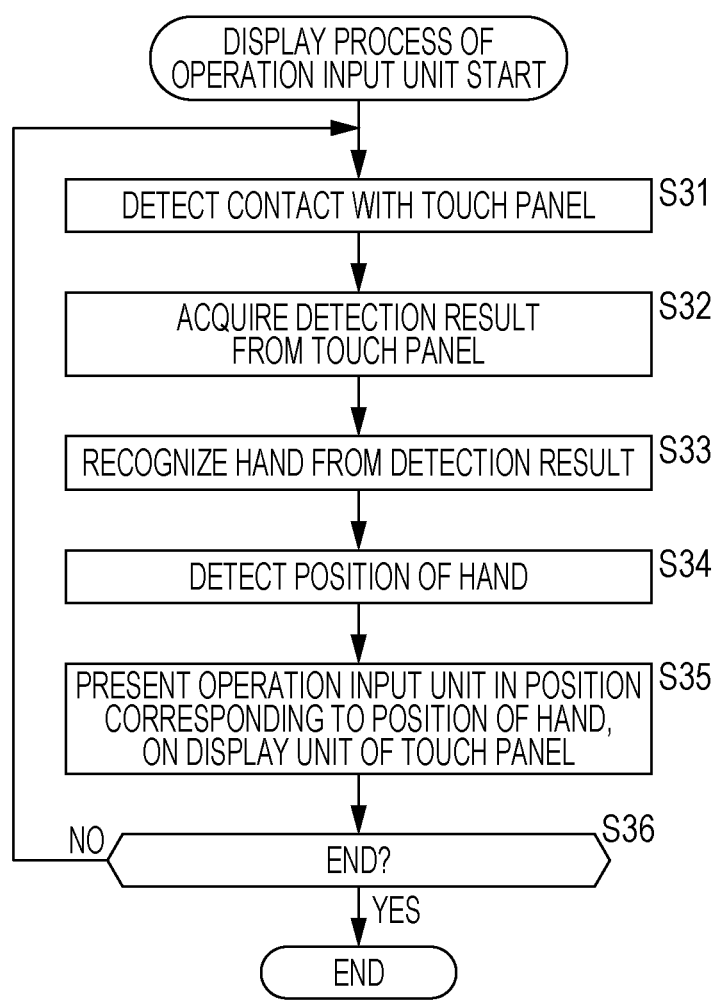
FIG. 6 is a flowchart describing a display process of an operation input unit in the information processing system of FIG. 4.

Next, referring to the flowchart of FIG. 6, the display process of the operation input unit in the information processing system of FIG. 4 will be described.

In step S31, the contact detection unit 72 detects the presence or absence of the contact of the hand, based on the change in capacitance in the vicinity of the surface of the display unit 71 of the touch panel 51 configured on a desk, and specifies the position when it is regarded that there is contact. Then, the contact detection unit 72 supplies the control unit 52 with information on the contact detection result including the presence or absence of the contact, positional information in the display unit 71 when there is contact and the amount of change in capacitance, based on the change in capacitance in the vicinity of the surface of the display unit 71 configured on a desk.

In step S32, the contact detection result acquisition unit 91 acquires the information on the contact detection result which is supplied from the touch panel 57.

In step S33, the hand recognition unit 92 recognizes that the hand is present in the display unit 71 of the touch panel 51, by acquiring positional information when there is contact due to a change in capacitance in the vicinity of the surface of the display unit 71 configured on the desk, based on the information on the contact detection result acquired by the contact detection result acquisition unit 91. Since it is possible to specify a range of the amount of change in capacitance to some extent when the hand of the human body touches, whether the hand of the human body approaches or comes into contact with the display unit 71 of the touch panel 51 is specified and the contact position is specified at the same time.

In step S34, the hand position detection unit 93 detects a position at which contact is detected in the display unit 71 of the touch panel 51 as the position of the hand, based on the information of the contact position of the hand which is recognized by the hand recognition unit 92.

In step S35, the display control unit 94 for an operation input unit displays (presents) the operation input unit in a position on the display unit 71 of the touch panel 51 corresponding to information on the position of the hand detected by the hand position detection unit 93. In other words, as shown in FIG. 4, when it is recognized that the left hand LH and the right hand RH are present on the display unit 71 of the touch panel 51, the operation input unit is displayed (presented) under the palm of each of the left hand LH and the right hand RH or in the position in the vicinity thereof on the display unit 71 of the touch panel 51.

Through the process described above, in the same manner as in the case of the information processing system of FIG. 1, as long as the left hand LH and the right hand RH of the user are present in the vicinity of the display unit 13 configured on a desk, it is possible to display the operation input unit including a keyboard or operation buttons in the nearest position without there being awareness of the positions of the left hand LH and the right hand RH. As a result, since the operation input unit operated by the left hand LH and the right hand RH is displayed simply by putting the left hand LH and right hand RH in a certain position on the display unit 13 or placing them within a certain space on the desk configured by the display unit 13, it is possible to perform an operation input while minimizing the movement distances of the left hand LH and the right hand RH. Further, when the left hand LH and the right hand RH are present above a desk, that is, the display unit 13, it is possible to display the operation input unit immediately below a palm, thereby allowing the operation input to be completed simply by moving the fingers when the operation input is performed.

Further, although a case where the detection of the contact position on the touch panel 51 is performed based on the change in capacitance is described, a touch panel in which the contact of the human body is detected together with the contact position, for example, an optical type touch panel or the like may be used.

3. Third Embodiment

[External Configuration Example of Information Processing System in Case of Taking Configuration of Display Unit as Configuration of Projection Type]

Although the foregoing describes a self-luminous type display device such as an LCD or an organic EL as the configuration of the display unit 13, the display unit 13 may have a configuration that can project an image to be displayed on the display unit 13 on the desk.

Figure 7:
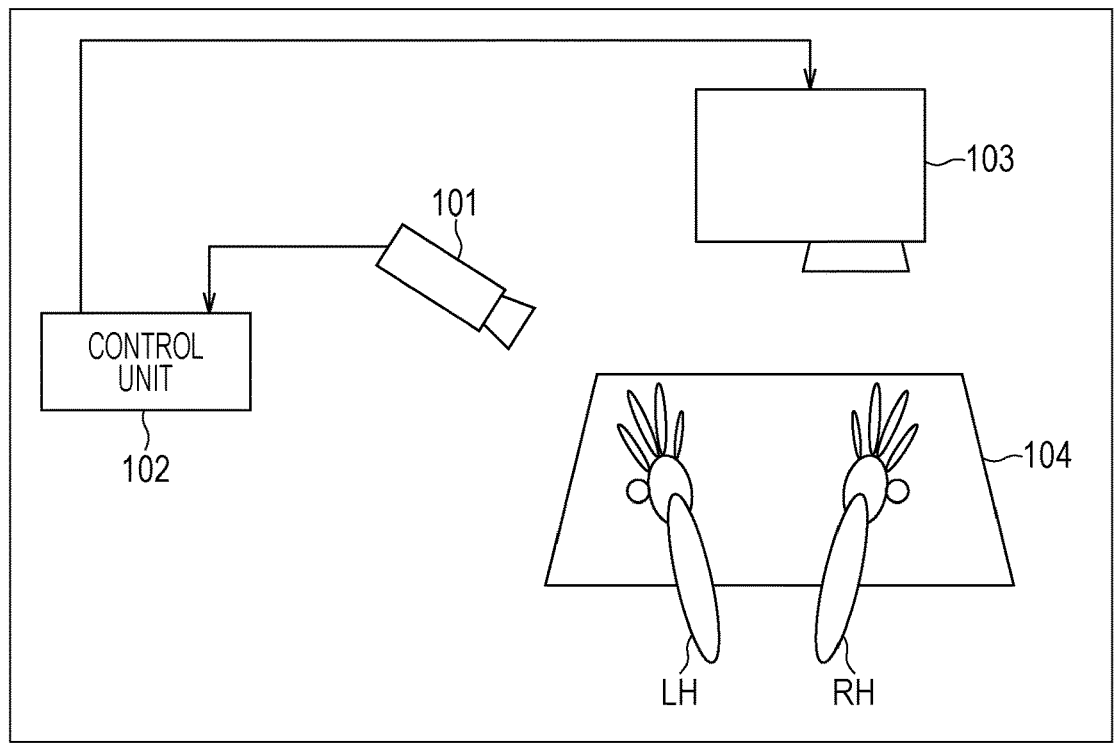
FIG. 7 is a diagram showing an external configuration example of a third embodiment of an information processing system to which the present technology is applied.

FIG. 7 is a diagram showing an external configuration of an information processing system in which a projection unit is provided instead of the display unit 13 so as to project and display an image has been displayed on the display unit 13 on a desk. The information processing system of FIG. 7 includes an imaging unit 101, a control unit 102, a projection unit 103, and a desk (projection plane) 104, and the basic functions are the same as in the imaging unit 11, the control unit 12, and the display unit 13 of the information processing system of FIG. 1. However, the image to be displayed by the display unit 13 is projected onto the desk (projection plane) 104 by the projection unit 103.

[Configuration Example of Information Processing System of FIG. 7]

Figure 8:
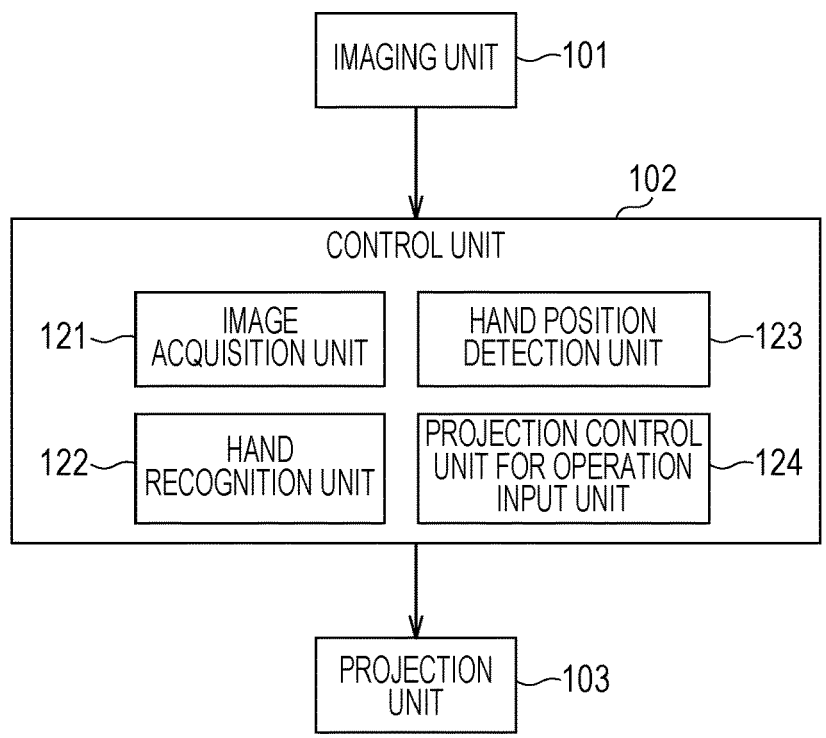
FIG. 8 is a diagram showing a configuration example of the information processing system of FIG. 7.

Next, referring to FIG. 8, a configuration example for implementing the information processing system of FIG. 7 will be described. Further, the imaging unit 101 is the same as the imaging unit 11 and the projection unit 103 is the same as the display unit 13 in functions other than a presentation method of an image, so that the description thereof will be omitted.

Further, the control unit 102 includes an image acquisition unit 121, a hand recognition unit 122, a hand position detection unit 123, and a projection control unit 124 for an operation input unit. The image acquisition unit 121 acquires an image captured by the imaging unit 101. The hand recognition unit 122 recognizes a hand image including regions, onto which the user's hand is projected, in an image, from the image acquired by the image acquisition unit 121, based on feature information of a hand such as a skin color and a presence or absence of a finger and a nail.

The hand position detection unit 123 detects a position at which the hand of the user is present relative to the desk 104 which is a projection plane, from information within an image, based on information of the hand image recognized by the hand recognition unit 122. The projection control unit 124 for an operation input unit controls the projection unit 103 based on information on a position relative to the desk 104 which is a projection plane, detected by the hand position detection unit 123, and controls the display (presentation) of the operation input unit of the desk 104.

[Display Process of Operation Input Unit by Information Processing System of FIG. 7]

Figure 9:
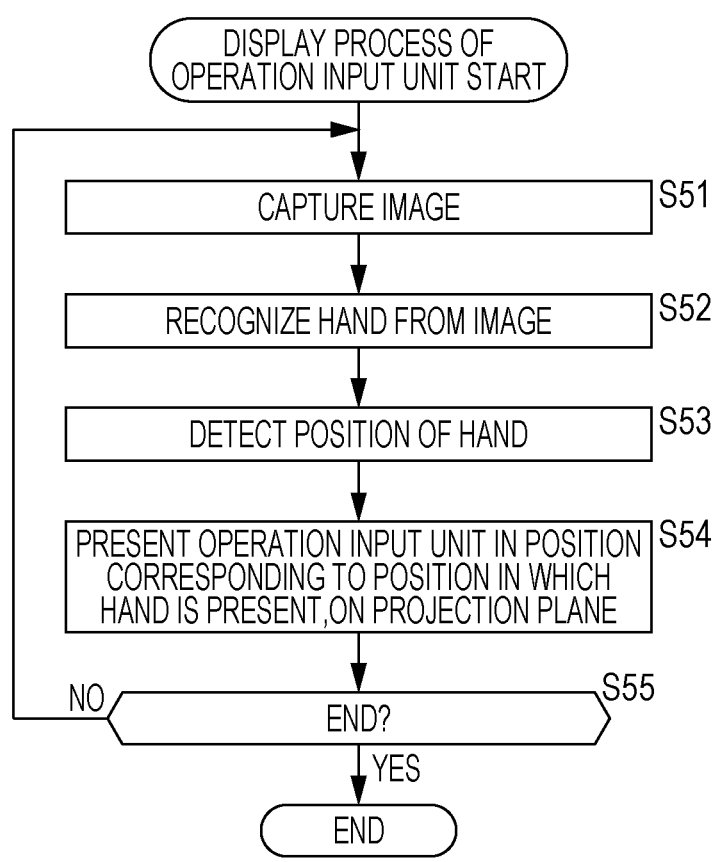
FIG. 9 is a flowchart describing a display process of an operation input unit in the information processing system of FIG. 7.

Next, referring to a flowchart of FIG. 9, a display process of an operation input unit in the information processing system of FIG. 7 will be described.

In step S51, the imaging unit 101 captures an image of the vicinity of the desk 104 which is projected by the projection unit 103, and supplies the captured image to the control unit 102. The image acquisition unit 121 of the control unit 102 acquires the image of the vicinity of the desk 104 which is captured by the imaging unit 101 and projected by the projection unit 103.

In step S52, the hand recognition unit 122 recognizes the hand image by feature information of the hand, from the image of the vicinity of the desk 104 which is acquired by the image acquisition unit 121 and onto which an image is projected by the projection unit 103. In other words, the feature information of the hand is a skin color and a presence or absence of a finger and a nail, and the hand recognition unit 122 searches for a region by comparing such feature information of the hand with the image, and recognizes the searched for region as the hand image.

In step S53, the hand position detection unit 123 detects the position of the hand image recognized by the hand recognition unit 122, in the image acquired by the image acquisition unit 121, and detects the position of the detected hand image in the image as the position of the hand.

In step S54, the projection control unit 124 for an operation input unit controls the projection unit 103 so as to project the operation input unit in the position of the desk 104 corresponding to the information on the position of the hand detected by the hand position detection unit 123. In other words, as shown in FIG. 7, when it is recognized that the left hand LH and the right hand RH are present on the desk 104, the operation input unit is projected under the palm of each of the left hand LH and the right hand RH or in the position in the vicinity thereof, on the desk 104 corresponding to the positions of respective palms of the left hand LH and the right hand RH.

Through the process described above, as long as the left hand LH and the right hand RH of the user are present in the vicinity of the desk 104 onto which an image is projected by the projection unit 103, it is possible to display the operation input unit including a keyboard, operation buttons, or the like in the nearest position without there being awareness of the positions of the left hand LH and the right hand RH. As a result, since the operation input unit operated by the left hand LH and the right hand RH is projected and displayed simply by putting the left hand LH and right hand RH in a certain position on the desk 104 or placing them within a certain space on the desk 104, it is possible to perform an operation input while minimizing the movement distances of the left hand LH and the right hand RH. Further, the operation input is completed simply by moving fingers or the like.

4. Fourth Embodiment

[External Configuration Example of Information Processing System in Case of Presenting Operation Input Unit According to Size, Position and Angle of the User's Hand]

Figure 10:
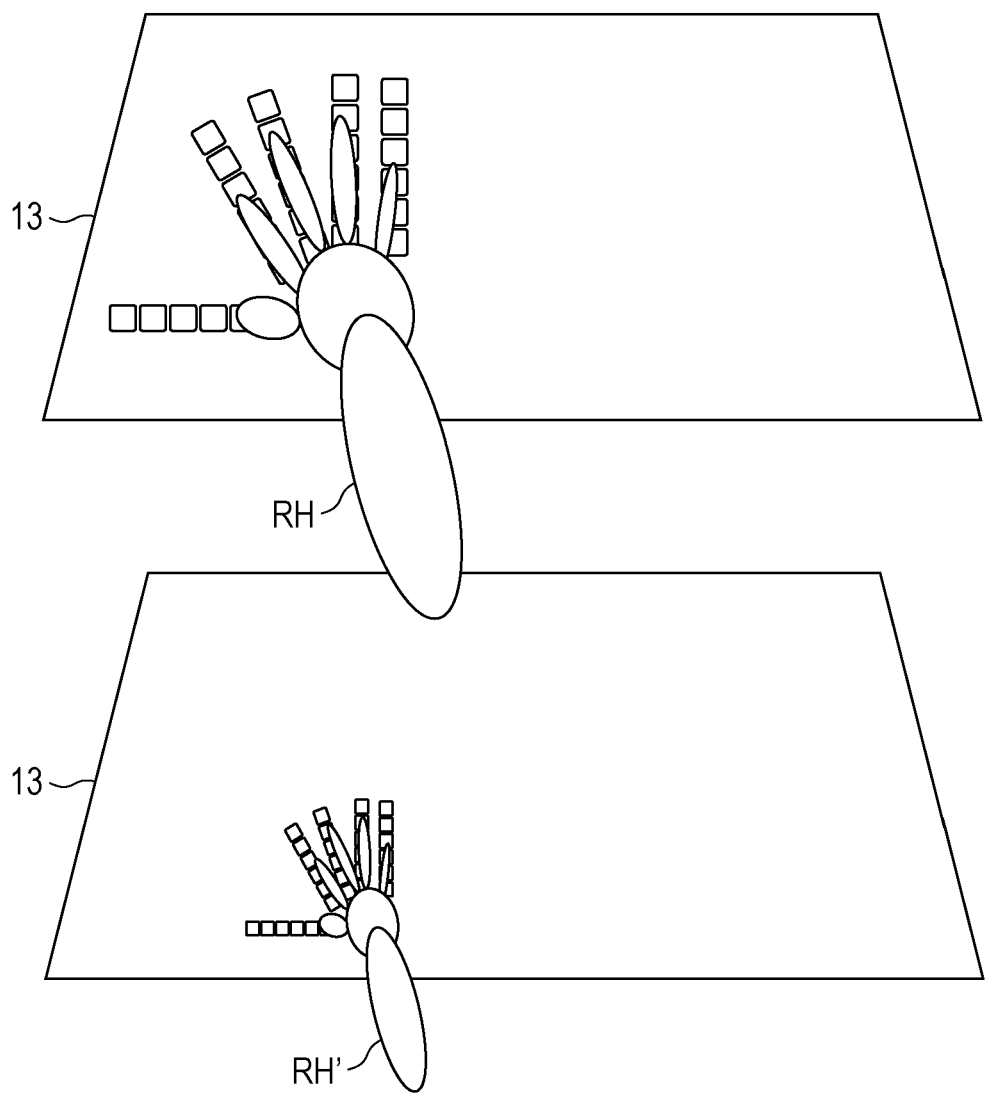
FIG. 10 is a diagram describing the display process of the operation input unit that displays the operation input unit depending on a size of a hand.

The foregoing describes a case where the position of the user's hand is detected and the operation input unit is displayed (presented) on the display unit 13 (or on the desk 104 projected by the projection unit 103). However, although the operation input unit is displayed in a normal standard size, there may actually be various sizes of the hand depending on the user, and for example, if the operation input unit of a normal size is presented for a user having a large hand, a plurality of keys or buttons may be pressed down with one finger. In a case of a physical operation input unit, the size needs to be fixed to a normal size, but in a case of a configuration in which the operation input unit is displayed in a manner described above, as shown in FIG. 10, it is possible to change a display size depending on the size of the user's hand. Further, an example is shown in the upper part of FIG. 10 in which a relatively large keyboard is displayed (presented) on the display unit 13 for the right hand RH of a large hand size. Further, an example is shown in the lower part of FIG. 10 in which a relatively small keyboard is displayed (presented) on the display unit 13 for the right hand RH' of a small hand size.

Figure 11:
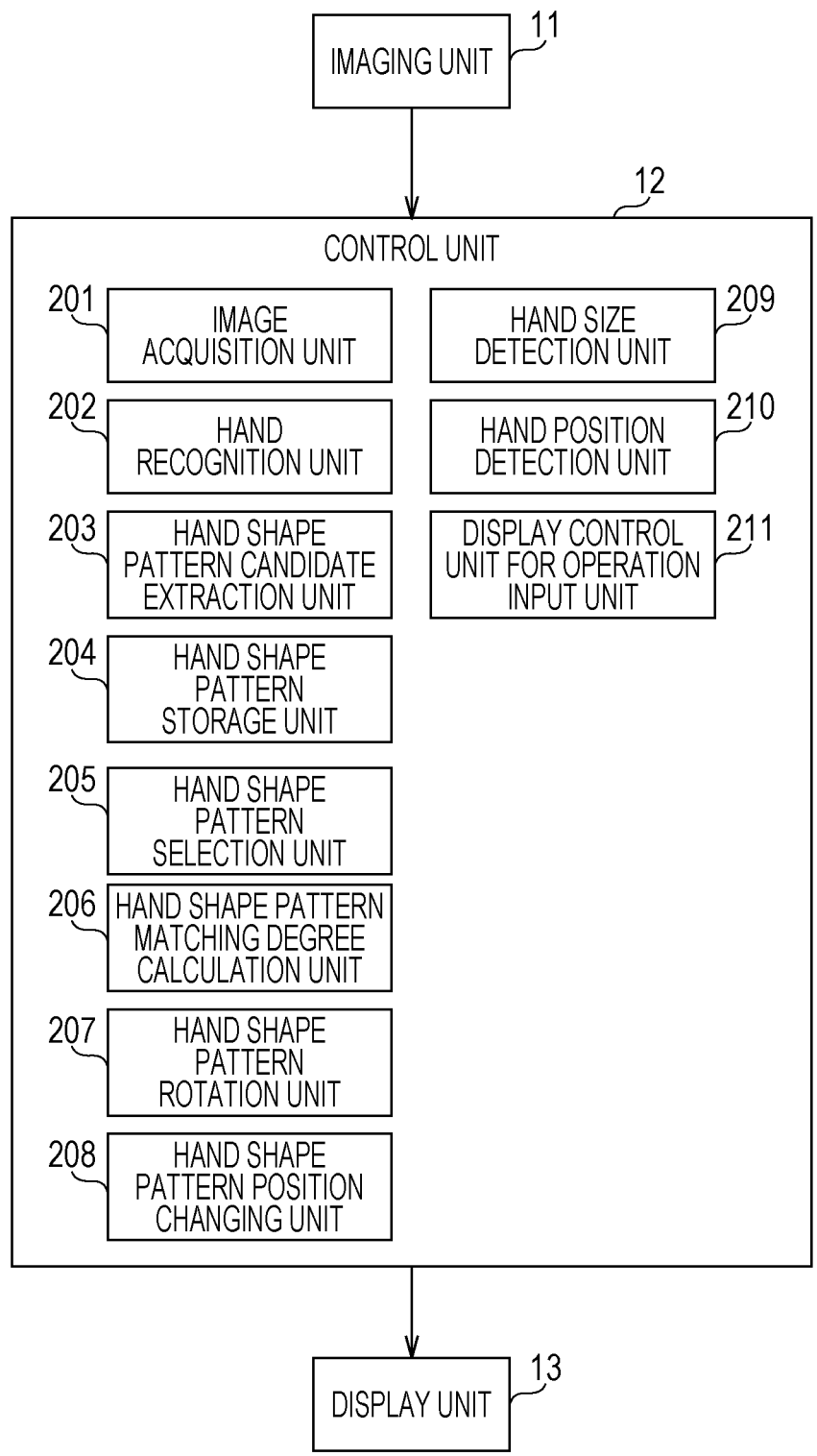
FIG. 11 is a diagram showing a configuration example of a fourth embodiment of an information processing system to which the present technology is applied.

FIG. 11 shows an information processing system configured to display (present) an operation input unit on the display unit 13 corresponding to the position, the size, and the direction of the user's hand. Further, since the external configuration is basically the same as that of FIG. 1, the description thereof will be omitted. Furthermore, since FIG. 11 is different from FIG. 2 only in the configuration of the control unit 12, only the control unit 12 will be described.

The control unit 12 of FIG. 11 includes an image acquisition unit 201, a hand recognition unit 202, a hand shape pattern candidate extraction unit 203, a hand shape pattern storage unit 204, a hand shape pattern selection unit 205, a hand shape pattern matching degree calculation unit 206, a hand shape pattern rotation unit 207, and a hand shape pattern position changing unit 208. Further, the control unit 12 of FIG. 11 includes a hand size detection unit 209, a hand position detection unit 210, and a display control unit 211 for an operation input unit.

Since the image acquisition unit 201 and the hand recognition unit 202 are the same as the image acquisition unit 31 and the hand recognition unit 32, the description thereof will be omitted.

The hand size detection unit 209 recognizes the size of the user's hand based on the hand image recognized by the hand recognition unit 202. More specifically, the hand size detection unit 209 detects the size of the hand from the area of the hand acquired from the hand image recognized by the hand recognition unit 202. The hand shape pattern storage unit 204 stores information regarding various hand shape patterns for respective various sizes. The hand shape pattern candidate extraction unit 203 extracts and stores, as a candidate, the hand shape pattern of the user of the size which is detected by the hand size detection unit 209 among the hand shape patterns stored in the hand shape pattern storage unit 204.

The hand shape pattern selection unit 205 sequentially selects hand shapes for calculating a matching degree with the hand image recognized by the hand recognition unit 202 from the hand shape patterns stored in the hand shape pattern candidate extraction unit 203, as the hand shape pattern to be processed. The hand shape pattern rotation unit 207 rotates the hand shape pattern to be processed by a predetermined angle each time the matching degree with the hand image is calculated. Each time the matching degree with the hand shape is calculated, the hand shape pattern position changing unit 208 moves the hand shape pattern to be processed in a predetermined range in the image acquired by the image acquisition unit 201 by a predetermined distance in a predetermined forward path.

The hand shape pattern matching degree calculation unit 206 calculates and stores the matching degree with the hand image while rotating each hand shape pattern to be processed selected by the hand shape pattern selection unit 205 by a predetermined angle and changing the position by a predetermined distance. Here, the hand shape pattern is an image including only the outline of the shape of the hand, and is smaller than the extracted hand image. Therefore, the hand size detection unit 209 extracts an image closer to the outline of the hand than the hand image as the hand shape region, and the hand shape pattern matching degree calculation unit 206 calculates the matching degree between the hand shape pattern to be processed and the hand shape region so as to be regarded as the matching degree between the hand shape pattern to be processed and the hand image. Further, the hand shape pattern rotation unit 207 and the hand shape pattern position changing unit 208 rotate the hand shape pattern to be processed by a predetermined angle and move the hand shape pattern to be processed by a predetermined distance in a predetermined forward path in the hand shape region, thereby allowing the hand shape pattern matching degree calculation unit 206 to calculate an appropriate matching degree. Further, the matching degree described here is an index indicating a degree of matching with the hand of the user which is recognized as the hand shape region when changing the shape pattern to be processed through rotation and position change. Accordingly, when the matching degree is high, it is regarded that the shape, the size, the rotation angle, and the position of the hand shape pattern to be processed match the hand shape region based on the hand image of the user.

The hand position detection unit 210 searches for the hand shape pattern having the highest matching degree, among the matching degrees calculated by the hand shape pattern matching degree calculation unit 206, and detects the size, the position, and the rotation angle of the user's hand, based on the hand shape pattern, when the searched for matching degree is higher than a predetermined matching degree and there is no problem in reliability. In other words, it is regarded that the hand shape pattern at a rotation angle and in a position having the highest matching degree is closest to the shape of the hand recognized as the hand image, and the hand of the user is present at the rotation angle in the position of the hand shape detected in the image.

The display control unit 211 for an operation input unit controls the display of the operation input unit on the display unit 13, based on the information on the position, the rotation angle, and the size of the hand relative to the display unit 13 detected by the hand position detection unit 210.

[Display Process of Operation Input Unit by Information Processing System of FIG. 11]

Figure 12:
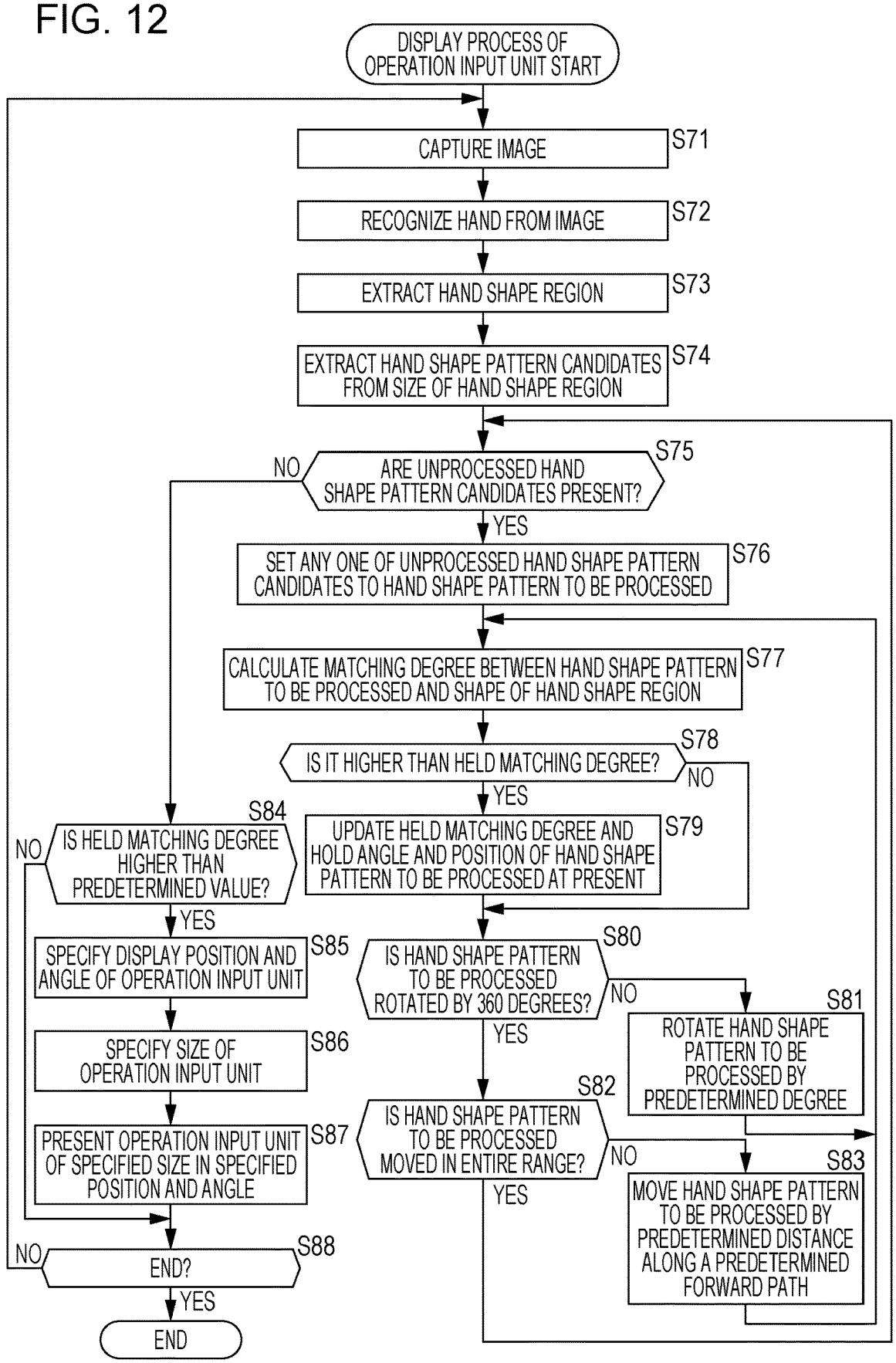
FIG. 12 is a flowchart describing a display process of an operation input unit in the information processing system of FIG. 11.

Next, referring to a flowchart of FIG. 12, a display process of an operation input unit in the information processing system of FIG. 11 will be described.

In step S71, the imaging unit 11 captures an image of the vicinity of the display unit 13 configured on a desk, and supplies the captured image to the control unit 12. The image acquisition unit 201 of the control unit 12 acquires an image of the vicinity of the display unit 13 configured on the desk captured by the imaging unit 11.

In step S72, the hand recognition unit 202 recognizes the hand image by feature information of the hand, from the image of the vicinity of the display unit 13 configured on the desk acquired by the image acquisition unit 201.

In step S73, the hand size detection unit 209 extracts a hand shape region in the image based on the hand image. In other words, although the hand image is an image extracted to an extent such that the position of the hand can be specified, from the image captured by the imaging unit 11, the hand image has low precision in obtaining the matching degree with the hand shape pattern. Therefore, the hand size detection unit 209 extracts only a region close to the outline shape of the hand from the hand image, as the hand shape region to improve its accuracy.

In step S74, the hand size detection unit 209 specifies the size of the user's hand from information of the hand shape region and supplies the information to the hand shape pattern candidate extraction unit 203. The hand shape pattern candidate extraction unit 203 extracts and stores, as the hand shape pattern which is a candidate, the hand shape pattern of the size which is specified as the size of the user's hand among the hand shape patterns stored in the hand shape pattern storage unit 204.

In step S75, the hand shape pattern selection unit 205 determines whether an unprocessed hand shape pattern is present or not, among candidates of the hand shape pattern extracted and stored by the hand shape pattern candidate extraction unit 203. In step S75, for example, when the unprocessed hand shape pattern is present, the process proceeds to step S76.

In step S76, the hand shape pattern selection unit 205 sets a certain unprocessed hand shape pattern among candidates of the hand shape pattern extracted and stored by the hand shape pattern candidate extraction unit 203, as the hand shape pattern to be processed. Further, the rotation angle of the hand shape pattern to be processed at this time is 0 degrees relative to a predetermined rotation direction, and it is a state in which the position in the hand shape region is set to an initial position in a predetermined movement order.

In step 377, the hand shape pattern matching degree calculation unit 206 calculates the matching degree between the hand shape pattern to be processed and the hand shape region.

In step S78, the hand shape pattern matching degree calculation unit 206 determines whether the calculated matching degree is higher than the matching degree which has been held so far. For example, since the held matching degree is a minimum value in the initial process, the calculated matching degree is necessarily higher than the matching degree which has been held so far, and the process proceeds to step S79.

In step S79, the hand shape pattern matching degree calculation unit 206 stores a new matching degree calculated at present by deleting the value of the matching degree which has been held so far. At this time, the hand shape pattern matching degree calculation unit 206 stores information on the rotation angle and the position of the hand shape pattern to be processed.

In contrast, in step S78, when the calculated matching degree is not higher than the matching degree which has been held so far, the process of step S79 is skipped.

In step S80, the hand shape pattern rotation unit 207 determines whether the hand shape pattern to be processed has been rotated by 360 degrees. In step S80, for example, when it is determined that the hand shape pattern to be processed has not been rotated by 360 degrees, in step S81, the hand shape pattern rotation unit 207 rotates the hand shape pattern to be processed at present by a predetermined angle, and the process returns to step S77. In other words, until it is determined that the hand shape pattern to be processed has been rotated by 360 degrees, the process of steps S77 to S81 is repeated so as to rotate the hand shape pattern to be processed by a predetermined angle at a time, and a process to obtain the matching degree with the hand shape region is repeated until the hand shape pattern to be processed has been rotated by 360 degrees. Then, in step S80, when it is regarded that 360 degree-rotation has been performed, the process proceeds to step S82.

In step S82, the hand shape pattern position changing unit 208 determines whether the hand shape pattern to be processed has been moved in the entire range of the hand shape region. In step S82, when it is determined that the hand shape pattern has not been moved in the entire range of the hand shape region, in step S83, the hand shape pattern position changing unit 208 moves the position of the hand shape pattern to be processed by a predetermined distance along a predetermined forward path, and the process returns to step S77. In other words, the process of steps S77 to S83 is repeated until the matching degree is obtained at all degrees and positions, while the hand shape pattern to be processed is rotated by each predetermined angle and is moved in the entire range of the hand shape region by a predetermined distance along a predetermined forward path in step S82. Then, when it is regarded that the hand shape pattern to be processed has moved in an entire range while moving in the entire range of the hand shape region by a predetermined distance along a predetermined forward path in step S83, the process proceeds to step S75.

In other words, with respect to all candidates of the hand shape pattern that matches the size specified based on the hand shape region based on the shape of the user's hand, the process of steps S75 to S83 is repeated until the matching degree with the hand shape region is obtained by changing the positions of all candidates by each predetermined distance while rotating all candidates by each predetermined angle.

Then, in step 375, if there is a state where there are no unprocessed hand shape patterns among all candidates of the hand shape pattern, the process proceeds to step S84.

In step S84, the hand shape pattern matching degree calculation unit 206 determines whether or not the value of the matching degree which is held at present is higher than a predetermined value and has reliability. In step S84, when it is regarded that the held matching degree is a matching degree having a value higher than a predetermined value and sufficient reliability, the process proceeds to step S85.

In step S85, the hand position detection unit 210 specifies the rotation direction and the display position for displaying of the operation input unit, based on the information on the size of the hand shape pattern of the highest matching degree. In other words, since the rotation angle and the position having a high matching degree show a degree and a positional relationship relative to the display unit 13 by which the user's hand is, the hand position detection unit 210 specifies the position and the rotation angle on the display unit 13 of the operation input unit to be displayed from the information.

In step S86, the hand size detection unit 209 specifies the size of the operation input unit to be displayed from the size of the hand shape pattern having a high matching degree.

In step S87, the display control unit 211 for an operation input unit displays the operation input unit of a specified size in the specified position and angle on the display unit 13.

In other words, in the process of step S84, when it is regarded that the maximum value of the matching degree is not greater than a predetermined value and does not have reliability, the process of steps S85 to S87 is skipped.

Further, in step S88, the control unit 12 determines whether the termination of the operation input unit display control process is instructed or not by the operation input unit displayed on the display unit 13 being operated, and when the termination is not instructed, the process returns to step S71 and the subsequent process is repeated. Then, when it is determined that the termination of the operation input unit display control process is instructed in step S88, the process is terminated.

In other words, through the above process, the operation input unit is displayed in a position on the display unit, corresponding to the size of the user's hand for the display unit 13, and the angle and the position for the display unit 13 where the user's hand is present. As a result, the user is not required to match the position and the direction of the hand at present to the display direction of the operation input unit, and may perform an input operation without being aware of the direction and the position of the operation input unit to be displayed. Since the operation input unit to be displayed is displayed in a size corresponding to the size of the user's hand, it is possible to suppress an erroneous touch of a person simultaneously pressing down two keys or buttons occurring when a person having large fingers presses down small keys or buttons. Further, as shown in the second embodiment, since the size, the rotation angle, and the position of the hand can be obtained as described above even when the contact of the user's hand is detected in the touch panel and the like, it is possible to implement the same process and thus to achieve the same effect as a result.

5. Fifth Embodiment

[Configuration Example of Information Processing Terminal in Case of Presenting Operation Input Unit According to the Size, the Position, and the Degree of a Part of the User's Hand]

Although the foregoing describes a case where the display unit 13 displaying the operation input unit configures a desk, implementing the information processing system described above not as a desk but as, for example, a tablet terminal of a B5 size or so is considered. It is assumed that a device such as a tablet terminal is used by being placed on a desk or is used in a state of being gripped by the right and left hands. In such a case, when the device is used by being placed on a desk, displaying the operation input unit in the same manner as that described above is considered. However, when the device is gripped by the right and left hands, displaying the operation input unit according to the size, the rotation angle and the position of a part of a hand, for example, a thumb or the like is considered as being highly convenient and practical.

Figure 13:
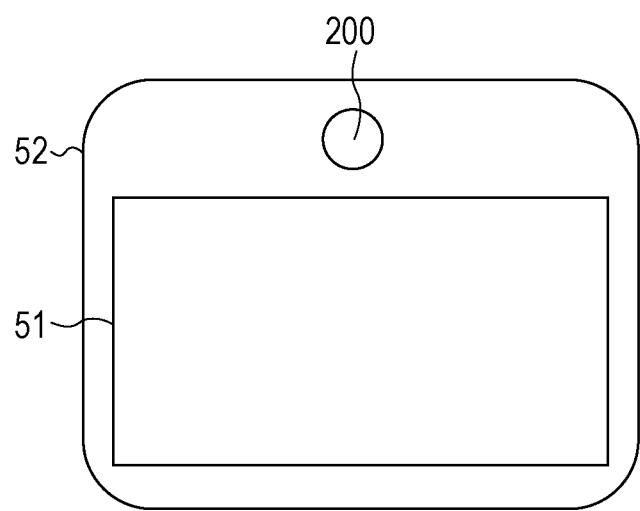
FIG. 13 is a diagram showing an external configuration example of a fifth embodiment of an information processing terminal to which the present technology is applied.
Figure 14:
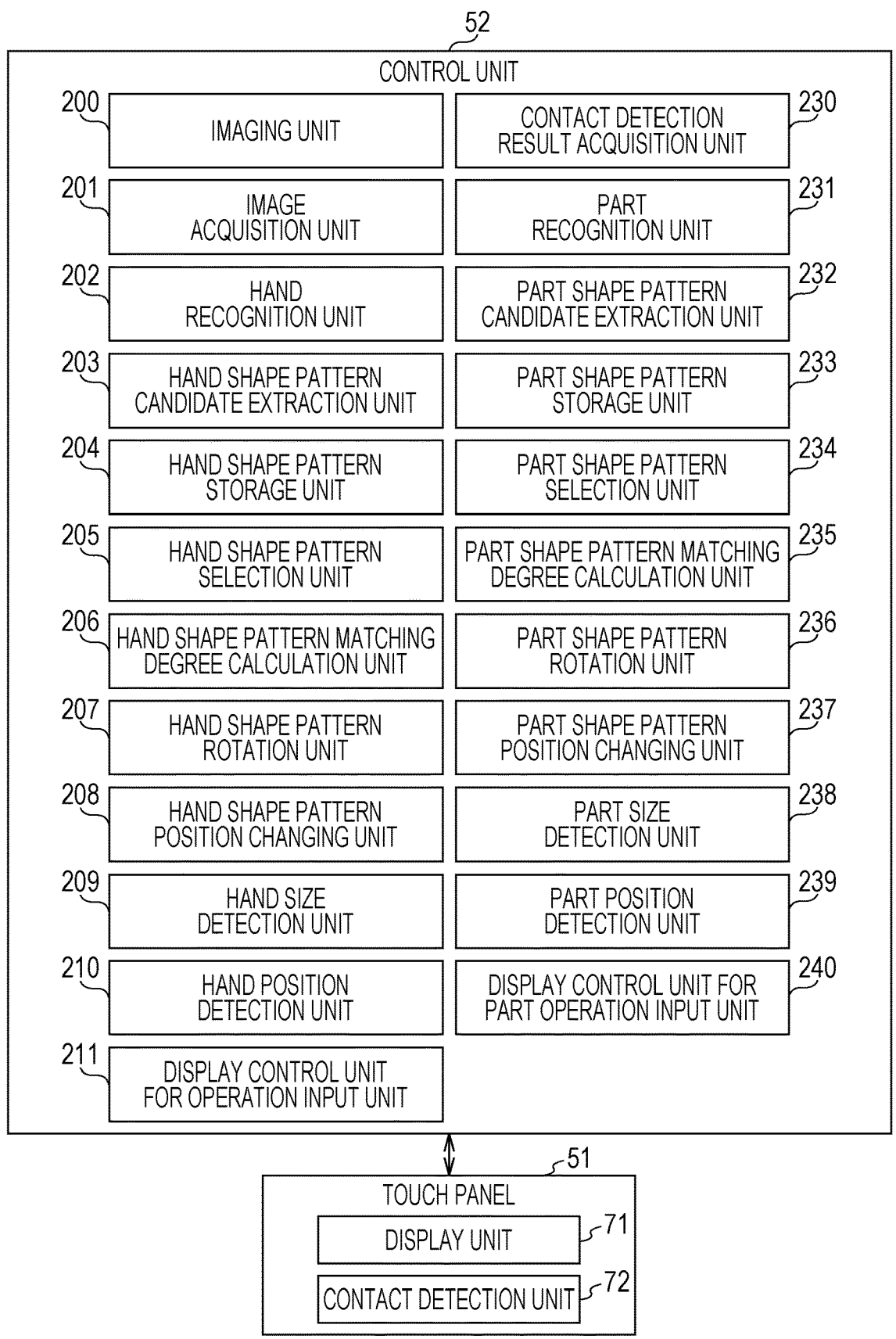
FIG. 14 is a diagram showing a configuration example of the information processing terminal of FIG. 13.

Therefore, next, referring to the external configuration diagram of FIG. 13 and the block diagram of FIG. 14, an information processing system which is configured to display an operation input unit conforming to the user's hand according to the size, the rotation angle and the position of the hand, and to display an operation input unit conforming to a part of user's hand according to the size, the rotation angle, and the position of the part of the hand will be described. Further, since the basic configuration is the same as that of the information processing system of FIG. 5, the components having the same functions are assigned by the same names and the same reference numerals and the descriptions thereof will appropriately be omitted. In other words, the information processing terminal of FIGS. 13 and 14 is different from the information processing system of FIG. 5 in that the terminal of FIGS. 13 and 14 is a tablet terminal as shown in FIG. 14 in which the touch panel 51 and the control unit 52 are configured as integral equipment. Accordingly, since FIGS. 13 and 14 show integral equipment, the information processing system is referred to as the information processing terminal.

Figure 5:
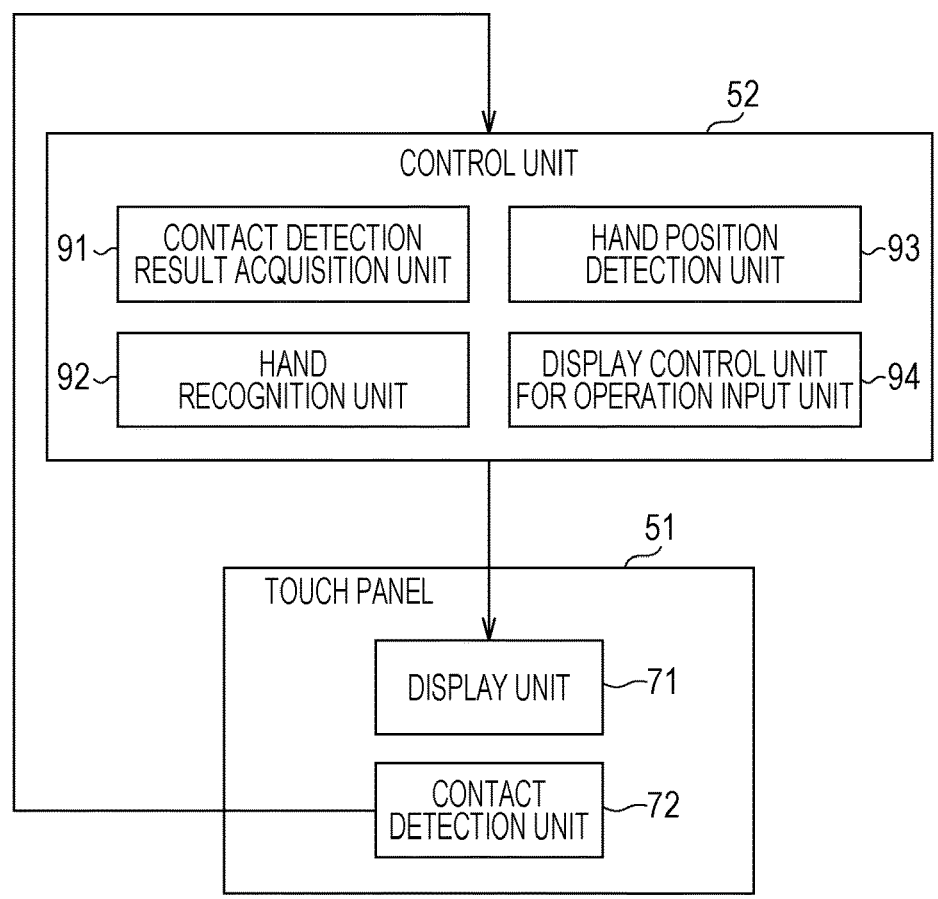
FIG. 5 is a diagram showing a configuration example of the information processing system of FIG. 4.

Further, although the basic configuration is the same as that of the information processing system of FIG. 5, as shown in FIG. 13, an imaging unit 200 is provided in the same direction as that of the display unit 71 of the touch panel 51, that is, in a facing position when the user grips the information processing terminal. Accordingly, when a process using an image of a hand or a finger which is a part of the hand is required, the image of the hand captured by the imaging unit 200 is used in a state where the user is close to the terminal immediately before the user grips the information processing terminal. Further, since the image acquisition unit 201 or the display control unit 211 for an operation input unit are the same as components included in the control unit 12 of the information processing system described referring to FIG. 11, the description thereof will be omitted.

The control unit 52 of FIG. 14 further includes a contact detection result acquisition unit 230, a part recognition unit 231, a part shape pattern candidate extraction unit 232, a part shape pattern storage unit 233, a part shape pattern selection unit 234, a part shape pattern matching degree calculation unit 235, a part shape pattern rotation unit 236, and a part shape pattern position changing unit 237. Further, the control unit 52 of FIG. 14 includes a part size detection unit 238, a part position detection unit 239, and a display control unit 240 for a part operation input unit.

The contact detection result acquisition unit 230 acquires information on the contact detection result indicating which position of a surface configuring the display unit 71 of the touch panel 51 is contacted, supplied from the touch panel 51. The part recognition unit 231 detects a part image including a region onto which a part of the user's hand is projected within an image, from the image acquired by the image acquisition unit 201, based on feature information such as a skin color, an interval between joints, a shape of a fingertip, and a shape of a nail. Further, the part recognition unit 231 recognizes which portion of a part of the hand the region of the part image is, based on the part image. In other words, the part recognition unit 231 recognizes, for example, which one of a thumb, an index finger, a middle finger, a ring finger, and a little finger a region detected as the part image of the hand is, and the like.

The part size detection unit 238 recognizes the size of a part shape region configuring a shape of a part of user's hand, based on the part image recognized by the part recognition unit 231. More specifically, the part size detection unit 238 detects the size of a part of the hand, for example, from an area of a tip portion of a finger which is a part region of the hand obtained from the part image recognized by the part recognition unit 231, or the like. The part shape pattern storage unit 233 stores information regarding part shape patterns of various hands for respective various sizes. The shape patterns of a part of the hand are, for example, images and the like of a first joint to a third joint of each of a thumb, an index finger, a middle finger, a ring finger, and a little finger. The part shape pattern candidate extraction unit 232 extracts and stores, as a candidate, the part shape pattern of the user's hand of the size detected by the part size detection unit 238, among the hand shape patterns stored in the part shape pattern storage unit 233.

The part shape pattern selection unit 234 sequentially selects a part shape pattern as a part shape pattern to be processed for calculating the matching degree with the part shape of the hand recognized by the part recognition unit 231, from the part shape patterns stored in the part shape pattern candidate extraction unit 232. The part shape pattern rotation unit 236 rotates the part shape pattern to be processed by a predetermined degree whenever the matching degree with the part shape region is calculated. Each time the matching degree with the part shape region is calculated, the part shape pattern position changing unit 237 moves the part shape pattern to be processed in a predetermined range in the part shape region acquired by the image acquisition unit 201 by a predetermined distance in a predetermined forward path.

The part shape pattern matching degree calculation unit 235 calculates and stores the matching degree with the part shape region while rotating each part shape pattern to be processed selected by the part shape pattern selection unit 234 by a predetermined angle and changing the position thereof by a predetermined distance. In other words, since the part shape pattern is an image including only the outline of the shape of a part of the hand and is smaller than the extracted part shape region, the part shape pattern rotation unit 236 and the part shape pattern position changing unit 237 rotate the part shape pattern to be processed by a predetermined degree and move the part shape pattern to be processed in the part shape region by a predetermined distance in a predetermined forward path, thereby allowing the part shape pattern matching degree calculation unit 235 to calculate an appropriate matching degree.

The part position detection unit 239 searches for a part shape pattern having the highest matching degree among matching degrees calculated by the part shape pattern matching degree calculation unit 235, and when the part shape pattern has a matching degree higher than a predetermined matching degree and does not have a problem in reliability, the part position detection unit 239 detects a size, a position, and a rotation angle of a part of a user's hand, based on the part shape pattern. In other words, the part shape pattern at the rotation angle and the position having the highest matching degree is closest to the shape of a part of the hand recognized in the part image, and it is regarded that a part of the user's hand is present at the rotation angle and the position of the part shape detected in the image.

The display control unit 240 for a part operation input unit controls the display of the operation input unit on the display unit 71, based on the information on the position and the rotation angle relative to the display unit 71 detected by the part position detection unit 239 and the size of the part of the hand.

[Display Process of Operation Input Unit by Information Processing Terminal of FIG. 13]

Figure 15:
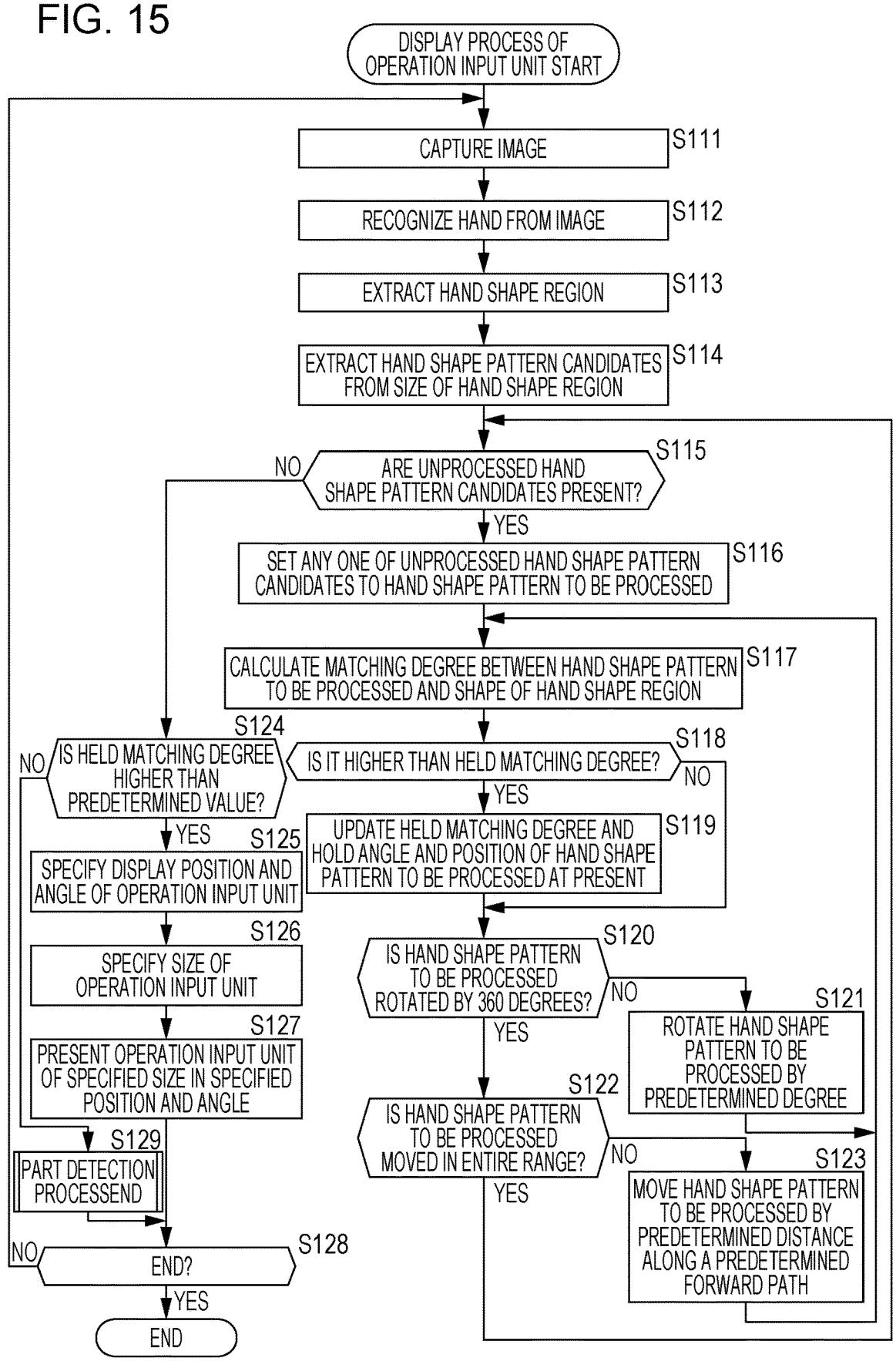
FIG. 15 is a flowchart describing a display process of an operation input unit in the information processing terminal of FIG. 13.

Next, a display process of an operation input unit in the information processing terminal of FIG. 13 will be described referring to a flowchart of FIG. 15. Further, since the process of steps S111 to S128 in the flowchart of FIG. 15 is the same as the process of steps S71 to S88 in the flowchart of FIG. 12, the description thereof will be omitted.

In step S124, when it is regarded that the held matching degree is lower than a predetermined value and has low reliability, the process proceeds to step S129, and a part detection process is performed so as to determine whether or not a part of the hand is used in the operation input. In other words, what is regarded as having the held matching degree lower than the predetermined value and having low reliability in step S124 is regarded as being used in an operation but not as a hand, so that from this result, as the subsequent process, a determination as to whether it is a part of a hand or not is performed.

[Part Determination Process]

Figure 16:
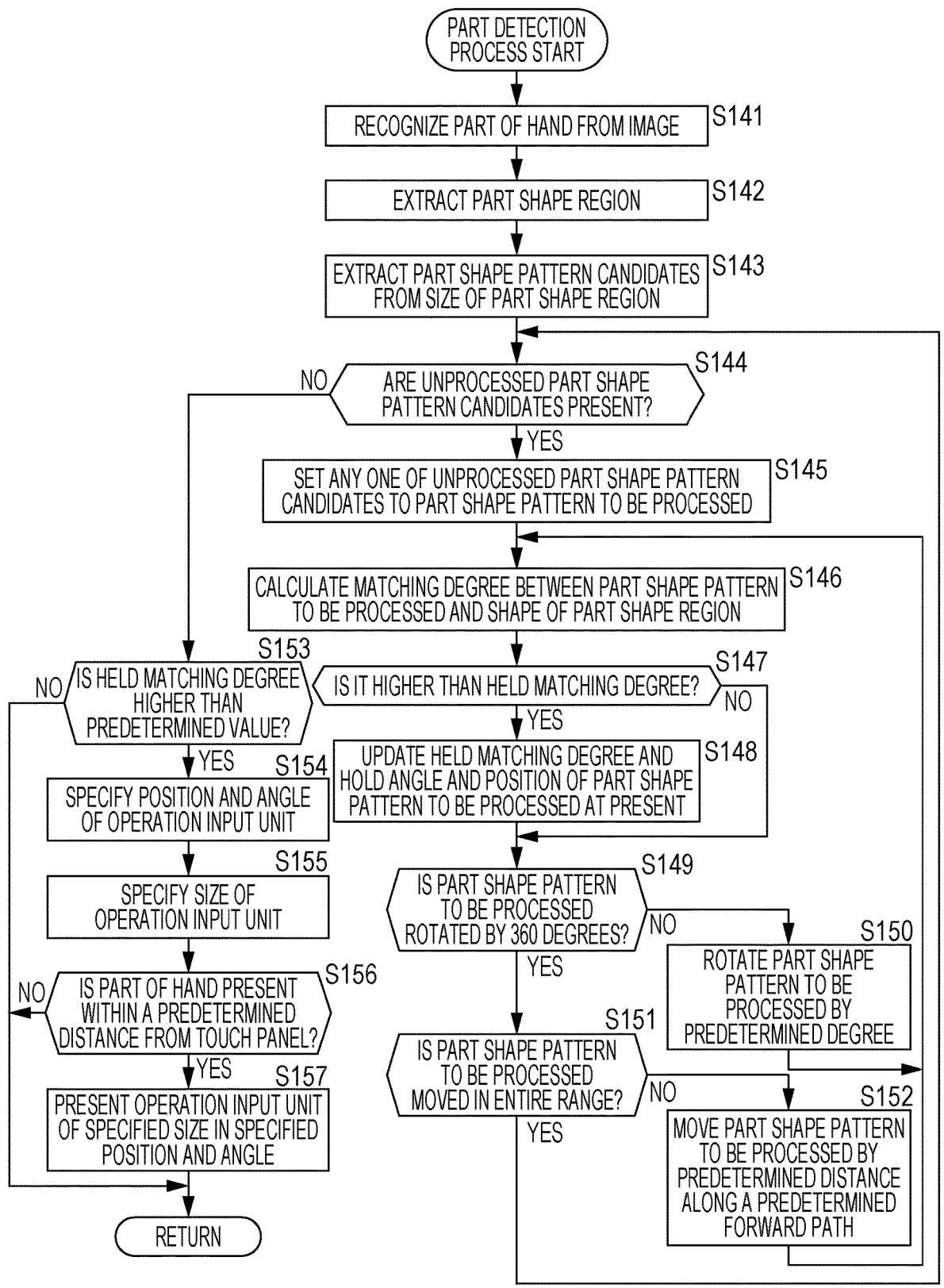
FIG. 16 is a flowchart describing a part detection process in the information processing terminal of FIG. 13.

Here, a part detection process will be described referring to a flowchart of FIG. 16.

In step S141, the part recognition unit 231 recognizes an image of a part of a hand by feature information of the part of the hand, from the image of the vicinity of the display unit 71 acquired by the image acquisition unit 201. At this time, the part recognition unit 231 specifies a part of a hand based on feature information used in generation of a part image. In other words, the part recognition unit 231 specifies, for example, any one of a thumb, an index finger, a middle finger, a ring finger, and a little finger as a part of the hand.

In step S142, the part size detection unit 238 extracts a part shape region in the image based on the part image. In other words, since the part image is an image extracted to an extent such that the position of the part of the hand can be specified, from the image captured by the imaging unit 200, the part image has low precision in obtaining the matching degree with the part shape pattern. Therefore, the part size detection unit 238 extracts a region configuring the outline of the shape of a part in the part image, as a part shape region, from the part image.

In step S143, the hand size detection unit 238 specifies the size of a part of the user's hand from information on the part shape region, and supplies the information to the part shape pattern candidate extraction unit 232. The part shape pattern candidate extraction unit 232 extracts and stores a part shape pattern of the size specified as the size of a part of the user's hand among part shape patterns stored in the part shape pattern storage unit 233, as a part shape pattern which is a candidate. Further, through the process described above, since it is recognized which one of a thumb, an index finger, a middle finger, a ring finger, and a little finger the part of the hand is, the part shape pattern candidate extraction unit 232 extracts a part shape pattern which is a candidate among the part shape patterns stored in the part shape pattern storage unit 233, based on the size of a part and the portion of a part.

In step S144, the part shape pattern selection unit 234 determines whether or not an unprocessed part shape pattern is present among candidates of the part shape pattern which are extracted by the part shape pattern candidate extraction unit 232 and stored. In step S144, for example, when there is the unprocessed part shape pattern, the process proceeds to step S145.

In step S145, the part shape pattern selection unit 234 sets any one of the unprocessed part shape patterns among candidates of the part shape pattern which are extracted by the part shape pattern candidate extraction unit 232 and stored, to a part shape pattern to be processed. At this time, it is assumed that the rotation angle of the part shape pattern to be processed is zero degrees relative to a predetermined rotation direction, and a position in the part shape region is set to an initial position in a predetermined forward movement path.

In step S146, the part shape pattern matching degree calculation unit 235 calculates a matching degree between the part shape pattern to be processed and the part shape region.

In step S147, the part shape pattern matching degree calculation unit 235 determines whether or not the calculated matching degree is higher than the matching degree which has been held so far. For example, since the held matching degree is a minimum value in the initial process, the calculated matching degree is necessarily higher than the matching degree which has been held so far, and the process proceeds to step S148.

In step S148, the part shape pattern matching degree calculation unit 235 stores a new matching degree calculated at present by deleting a value of the matching degree which has been held so far. At this time, the part shape pattern matching degree calculation unit 235 stores information on the rotation angle and the position of the part shape pattern to be processed.

In contrast, in step S147, when the calculated matching degree is not higher than the matching degree which has been held so far, the process of step S148 is skipped.

In step S149, the part shape pattern rotation unit 236 determines whether the part shape pattern to be processed has been rotated by 360 degrees. In step S149, for example, when it is determined that the part shape pattern to be processed has not been rotated by 360 degrees, in step S150, the part shape pattern rotation unit 236 rotates the part shape pattern to be processed at present by a predetermined angle, and the process returns to step S146. In other words, until it is determined that the part shape pattern to be processed has been rotated by 360 degrees, the process of steps S146 to S150 is repeated so as to rotate the part shape pattern to be processed by a predetermined angle at a time, and a process to obtain the matching degree with the part shape region is repeated until the part shape pattern to be processed has been rotated by 360 degrees. Then, in step S149, when it is regarded that 360 degree-rotation has been performed, the process proceeds to step S151.

In step S151, the part shape pattern position changing unit 237 determines whether the part shape pattern to be processed has been moved in the entire range of the part shape region. In step S151, when it is determined that the part shape pattern has not been moved in the entire range of the part shape region, in step S152, the part shape pattern position changing unit 237 moves the position of the part shape pattern to be processed in the part shape region by a predetermined distance along a predetermined forward path, and the process returns to step S146. In other words, the process of steps S146 to S152 is repeated until the matching degree is obtained at all degrees and positions, while the part shape pattern to be processed is rotated by each predetermined angle and is moved in the entire range of the part shape region by a predetermined distance along a predetermined forward path in step S151. Then, when it is regarded that the part shape pattern to be processed has moved in an entire range while moving in the entire range of the part shape region by a predetermined distance along a predetermined forward path in step S151, the process proceeds to step S144.

In other words, with respect to all candidates of the part shape pattern that matches the size specified based on the part shape region based on the shape of a part of the user's hand, the process of step S144 to S152 is repeated until the matching degree with the part shape region is obtained by changing the positions of all candidates by each predetermined distance while rotating all candidates by each predetermined angle.

Then, in step S144, if there is a state where there are no unprocessed part shape patterns among all candidates of the part shape pattern, the process proceeds to step S153.

In step S153, the part shape pattern matching degree calculation unit 235 determines whether or not the value of the matching degree which is held at present is higher than a predetermined value and has reliability. In step S153, when it is regarded that the held matching degree is a matching degree having a value higher than a predetermined value and sufficient reliability, the process proceeds to step S154.

In step S154, the part position detection unit 239 specifies the rotation direction and the display position for displaying of the operation input unit, based on the information of the size of the part shape pattern of the highest matching degree. In other words, since the rotation angle and the position having a high matching degree show a degree and a positional relationship relative to the display unit 71 by which the part of the user's hand is, the part position detection unit 239 specifies the position and the rotation angle on the display unit 71 of the operation input unit to be displayed from the information.

In step S155, the part size detection unit 238 specifies the size of the operation input unit to be displayed from the size of the part shape pattern having a high matching degree.

In step S156, the contact detection result acquisition unit 230 determines whether or not the user's hand or a part of the hand is present within a predetermined distance d from a surface of the touch panel 51, based on the capacitance detected by the contact detection unit 72. In step S156, for example, as shown in a left part of FIG. 17, when the touch panel 51 is viewed from the side, if the left finger LF is present within the distance d from the surface of the touch panel 51, the process proceeds to step S157.

In step S157, the display control unit 240 for a part operation input unit displays an appropriate operation input unit of the specified size of the part of the hand in the specified position and angle on the display unit 71 of the touch panel 51.

Figure 17:
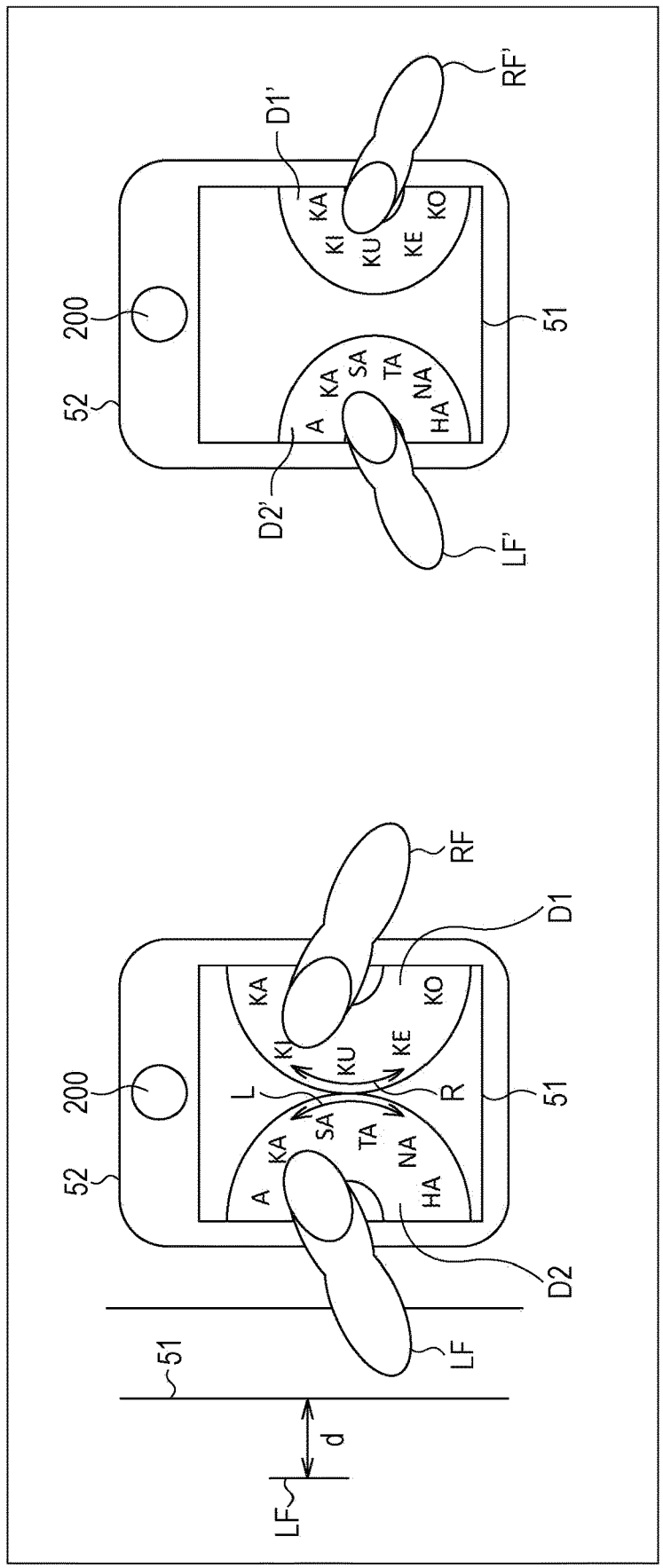
FIG. 17 is a diagram showing an example of the operation input unit displayed by the display process of the operation input unit in the information processing terminal of FIG. 13.

In other words, when the part of the hand which is specified by the part image is a thumb, if the thumb is relatively large, as shown in the center part of FIG. 17, an operation input unit of a size capable of being easily operated with a large finger is displayed on the display unit 71 of the touch panel 51. In the center part of FIG. 17, a dial D1 for inputting a vowel is displayed as an operation input unit on the right side and a dial D2 for inputting a consonant is displayed on the left side. The dial D1 can be rotated in an arrow R direction in response to the movement of the thumb RF of the right hand and a desired vowel can be input by being pressed. Further, the dial D2 can be rotated in an arrow L direction in response to the movement of the thumb LF of the left hand and a desired consonant can be input by being pressed.

In contrast, if the thumb is relatively small, as shown in the right part of FIG. 17, respective dials D1' and D2' which have the same shape but different sizes are displayed in a small size capable of being easily operated with thumbs LF' and RF' of a size smaller than the left and right thumbs LF and RF. Further, at the same time, respective dials D1, D2, D1' and D2' are displayed in positions corresponding to the positions of the thumbs LF, RF, LF', and RF'. In this manner, since the operation input unit of an appropriate size is displayed (presented) in an appropriate position and an appropriate angle according to the position, the rotation angle, and the size of the part of the hand, the user can easily perform an input operation without being aware of the positions of the finger. Further, since the operation input unit is displayed in a size suitable for the size of the finger, it is possible to prevent an erroneous touch or the like.

In contrast, in the process of step S153, when it is regarded that the maximum value of the matching degree is not greater than a predetermined value and reliability is low, the process of steps S154 to S157 is skipped. Further, in step S156, for example, as shown in the left part of FIG. 17, when the touch panel 51 is viewed from the side, when the left finger LF is not present within the distance d from the surface of the touch panel 51, the process of step S157 is skipped.

In other words, through the process described above, since the operation input unit is displayed in a position on the display unit corresponding to the size of a part of the user's hand, and the rotation angle and the position relative to the display unit, it is possible to perform the input operation without there being awareness of the direction and the position of the operation input unit to be displayed. Further, since the operation input unit to be displayed is displayed in a size according to the size of a part of the hand such as the finger of the user's hand, an operation input unit of a size not capable of being moved by a person having a small finger is not displayed, and thus it is possible to suppress a problem of not being operated or of being easily and erroneously touched.

Further, a case where a part of the hand such as a finger is not present within a predetermined distance from the surface of the display unit 71 of the touch panel 51 is regarded as being that the user does not have an intention to perform an operation input and the operation input unit is not displayed. Therefore, it is possible to prevent the displayed information from being reduced more than necessary even by a tablet device having a relatively small display unit 71.

Although the foregoing describes an example where the display process of the operation input unit is performed based on the image of the hand or a part of the hand captured by the imaging unit 200, the position and the size of the finger and the like may be detected, so that it is possible to implement the same process even by using the touch panel 51 which detects the presence or absence of contact by the capacitance described referring to FIG. 4.

Figure 18:
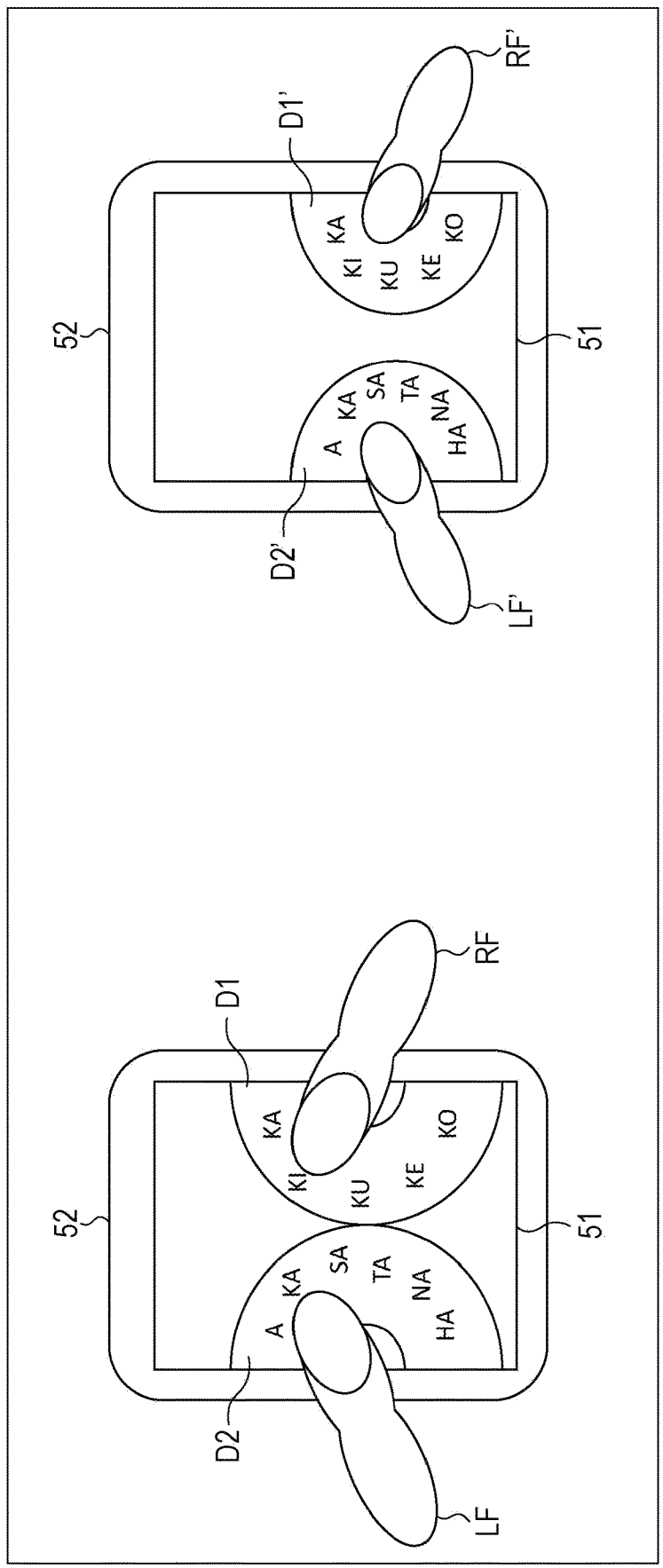
FIG. 18 is a diagram showing another example of the operation input unit displayed by the display process of the operation input unit in the information processing terminal of FIG. 13.

In other words, as shown in the left part and the right part of FIG. 18, even in a state where the imaging unit 200 is not incorporated into a main body, in a case of a touch panel, the size and the position of the finger can be specified by a change in capacitance, so that it is possible to display an operation input unit corresponding to the position and the size of the finger as a part of the hand. Further, an example of the operation input unit displayed in the left part and the right part of FIG. 18 is the same as the example of the operation input unit displayed in the center part and the right part of FIG. 17.

Figure 19:
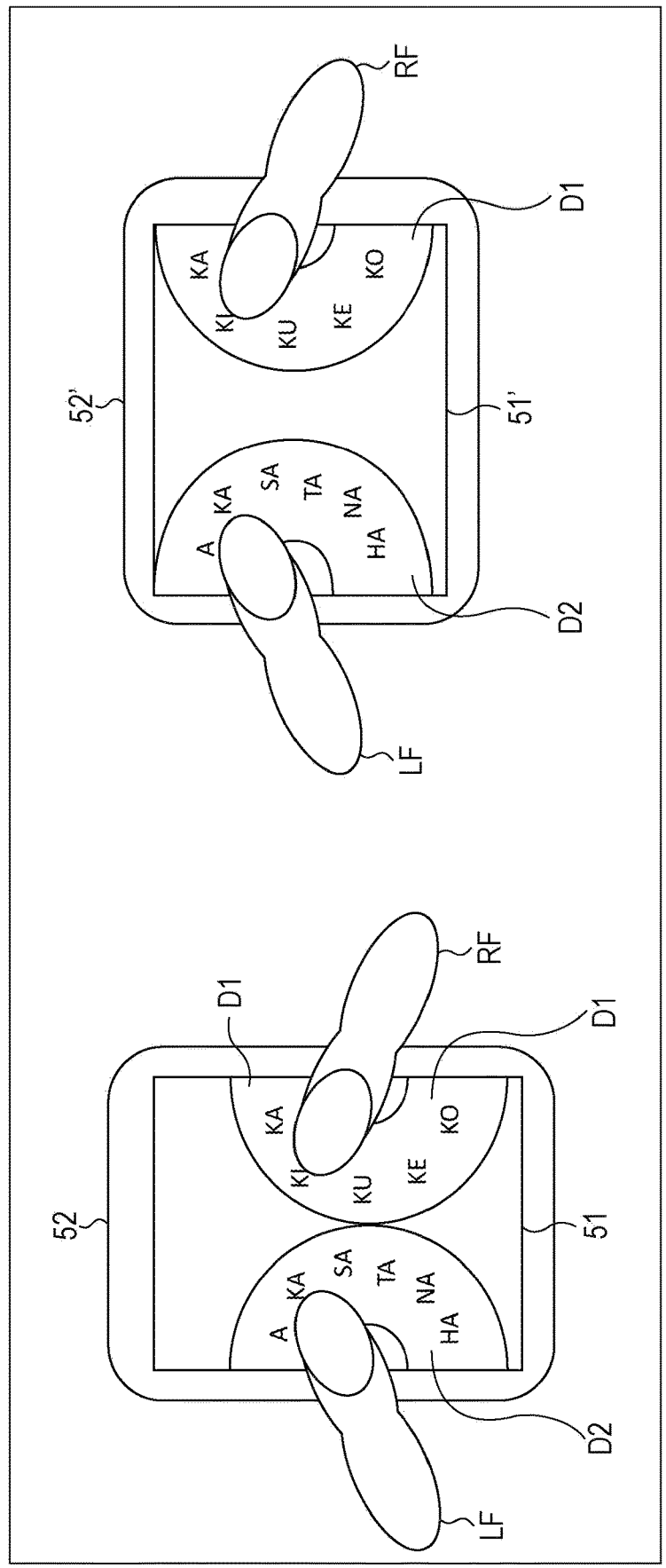
FIG. 19 is a diagram showing still another example of the operation input unit displayed by the display process of the operation input unit in the information processing terminal of FIG. 13.

Further, in many cases, a tablet device is equipped with a motion sensor and a function of displaying an image in a downward direction with respect to the gravity direction even if the user changes the display direction of the display unit in the horizontal direction or the vertical direction with respect to the gravity direction. In the case of such a tablet terminal, for example, as shown in FIG. 19, it is possible to cause the operation input unit to be displayed in a downward direction relative to the gravity direction detected by the motion sensor. In other words, in the left part of FIG. 19, when the long side of the touch panel 51 is parallel to the gravity direction, characters on the dials D1 and D2 are displayed along the long side. In contrast, when the short side of the touch panel 51 is parallel to the gravity direction, the characters on the dials D1' and D2' are displayed along the short side. By displaying in this way, it is possible to display the operation input unit in an appropriate direction in response to the movement of the motion sensor.

Figure 20:
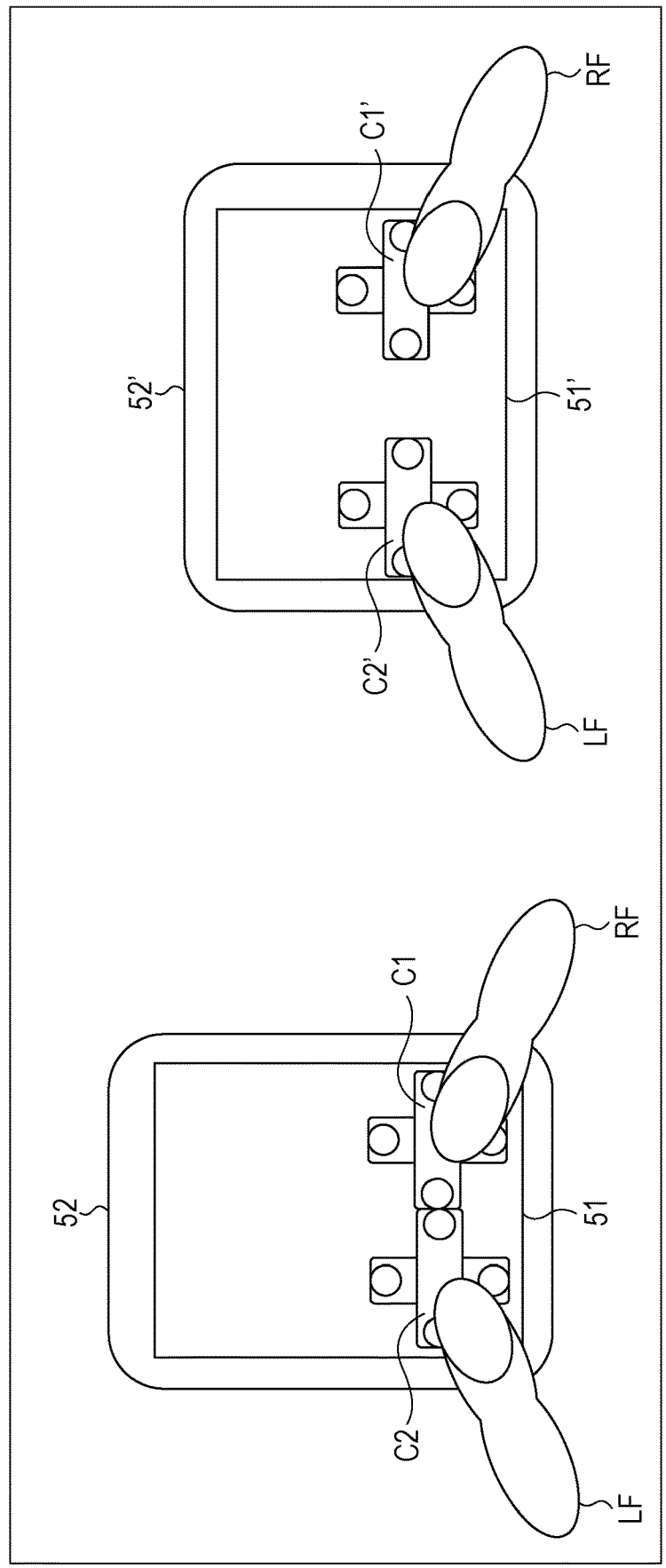
FIG. 20 is a diagram showing further still another example of the operation input unit displayed by the display process of the operation input unit in the information processing terminal of FIG. 13.

Further, when the display area of the display unit 71 of the touch panel 51 is significantly small, in some cases the operation input using the movement of the finger is difficult. Therefore, when the display area is small, instead of an operation input unit such as a dial operated by a large operation of a finger, for example, as shown in the left part of FIG. 20, cross keys C1 and C2 are displayed on the left and right side so as to be operated with the left thumb LF and the right thumb RF. By doing so, it is possible to implement a comfortable operation input even if the display unit 71 has a narrow area. Further, in this case, the operation input unit may be displayed corresponding to the gravity direction detected by the motion sensor, for example, when the long side of the touch panel 51 is parallel to the gravity direction as shown in the left part of FIG. 20, it is tilted by 90 degrees in the right direction in the drawing as shown in the right part of FIG. 20, and when the short side is parallel to the direction of the gravity, the cross keys C1' and C2' are displayed so as to be operated with the left thumb LF' and the right thumb RF'. By doing so, even if the touch panel 51 has a narrow area, it is possible to perform a comfortable operation input and to display the operation input unit corresponding to the movement of the motion sensor.

Figure 21:
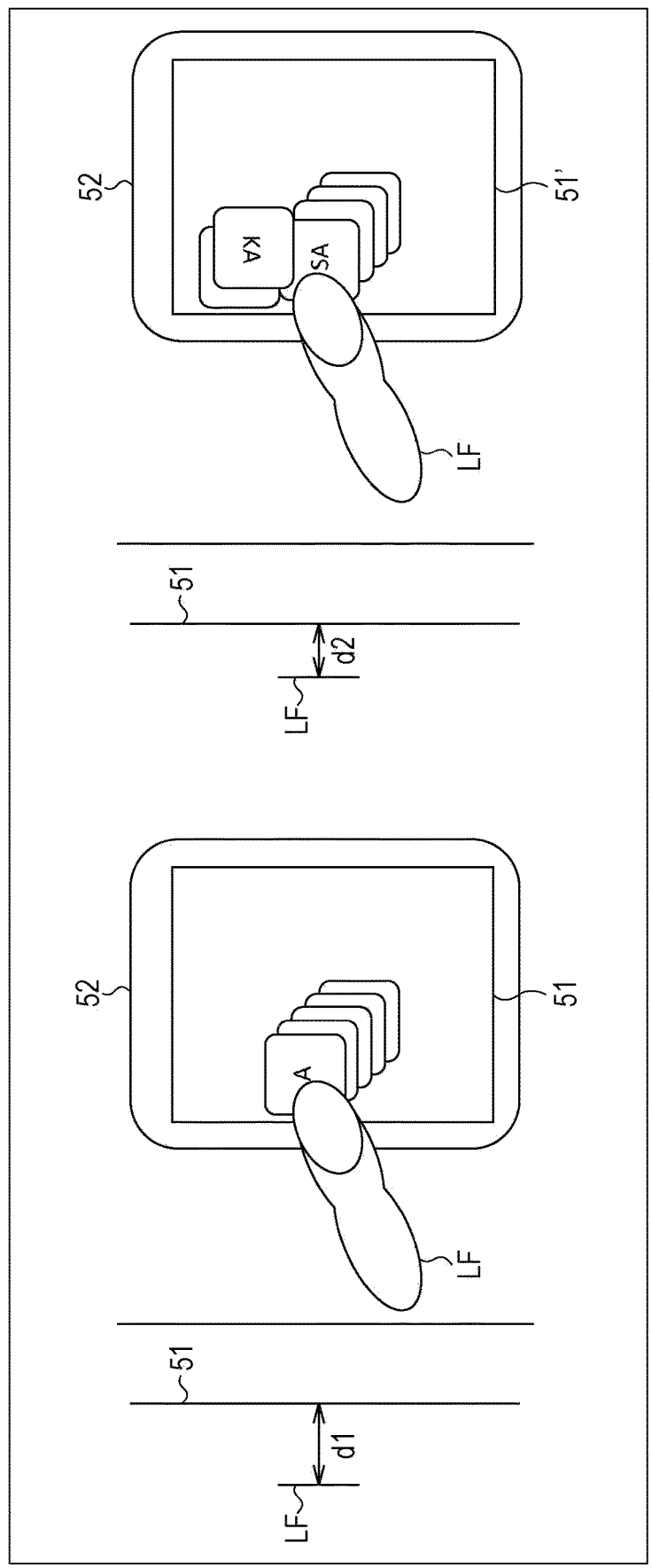
FIG. 21 is a diagram showing further still another example of the operation input unit displayed by the display process of the operation input unit in the information processing terminal of FIG. 13.

Further, although the contact detection unit 72 of the touch panel 51 detects the contact of a hand or a finger from the change in capacitance, the capacitance varies depending on the distance from the surface of the display unit 71 of the touch panel 51 even in a non-contact state. Then, as shown in FIG. 21, the display may be changed depending on the distance between the finger and the surface of the display unit 71 that can be detected from the change in capacitance. In other words, the distance from the left finger LF to the touch panel 51 is d1 in the left part of FIG. 21, and in this case, "A" can be selected as a first consonant. If the distance from the left finger LF to the touch panel 51 changes to d2 which is shorter than d1, as shown in the right part of FIG. 21, when the left finger moves more closely, the display gradually changes to "A", "KA", "SA", and, . . . , and the operation input unit may be displayed if the touch panel 51 is touched at a timing when a desired consonant is displayed.

6. Sixth Embodiment

[Configuration Example of Information Processing System when Presentation of Operation Input Unit is Switched by Gesture of User's Hand]

Although the foregoing describes a case where information subjected to an operation input by an operation input unit is input to any corresponding one of a software program and an operating system (OS), when a plurality of software programs or OSs are simultaneously activated, respective operation input units may be displayed corresponding to a position of a hand by switching software programs or OSs with a gesture of the hand.

Figure 22:
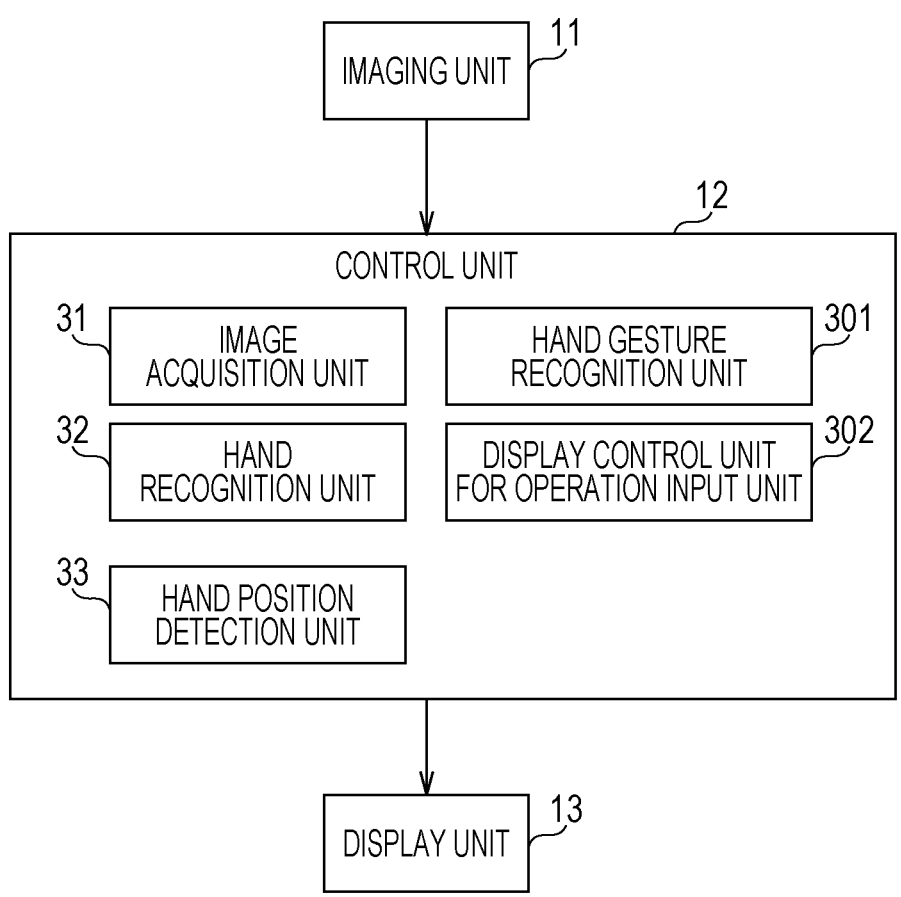
FIG. 22 is a diagram showing a configuration example of a sixth embodiment of an information processing system to which the present technology is applied.

FIG. 22 shows a configuration example of an information processing system capable of displaying respective operation input units corresponding to a position of a hand by switching software programs or Oss with a gesture of the hand, when a plurality of software programs or Oss are simultaneously activated. Further, those including the same functions as those in the information processing system of FIG. 2 are assigned by the same reference numerals, and thus the description thereof will be appropriately omitted. In other words, the information processing system of FIG. 22 is different from the information processing system of FIG. 2 in that the hand gesture recognition unit 301 is newly provided, and instead of the display control unit 34 for an operation input unit, a display control unit 302 for an operation input unit is provided. In addition, since the external configuration is the same as that of the information processing system of FIG. 1, the description thereof will be omitted.

The hand gesture recognition unit 301 recognizes a gesture of the hand based on a hand image used for specifying the position of the hand.

The display control unit 302 for an operation input unit stores an operation input unit according to a software program or an operation system in association with a hand gesture, and displays the operation input unit stored in association with the hand gesture in the position detected by the hand position detection unit 33.

[Display Process of Operation Input Unit by Information Processing System of FIG. 22]

Figure 23:
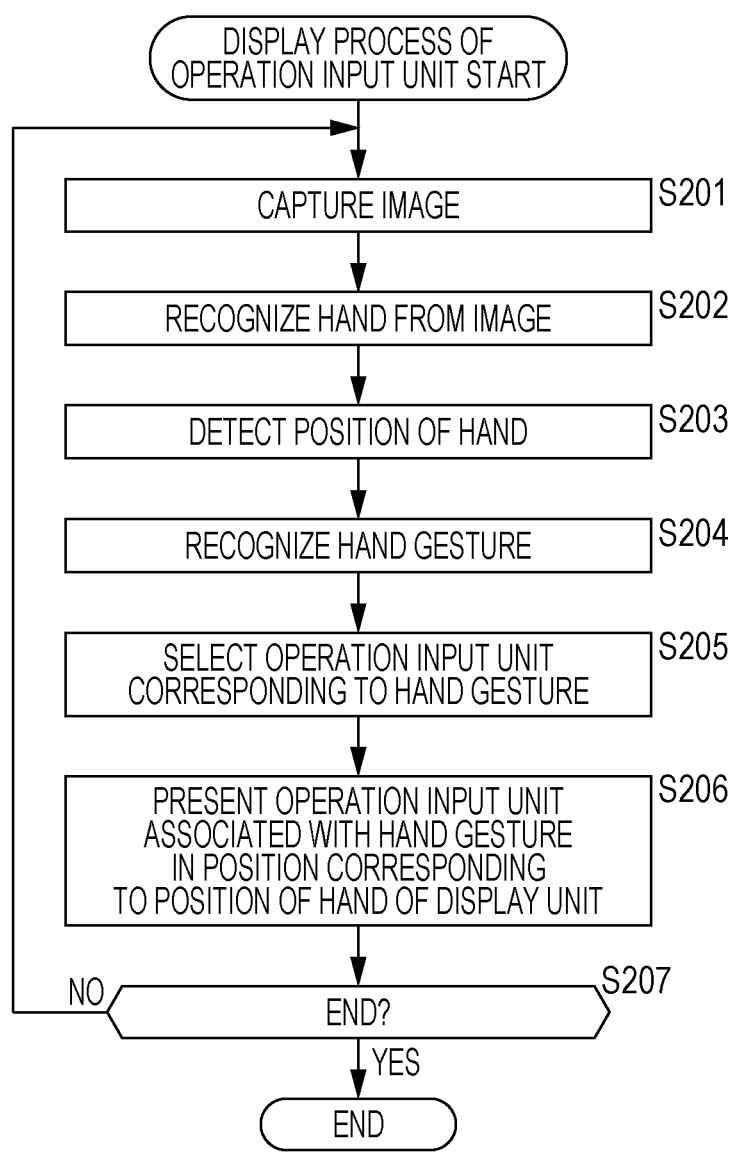
FIG. 23 is a flowchart describing a display process of an operation input unit in the information processing system of FIG. 22.

Next, the display process of an operation input unit by an information processing system of FIG. 22 will be described referring to a flowchart of FIG. 23.

In step S201, the imaging unit 11 captures an image of the vicinity of the display unit 13 configured on a desk, and supplies the captured image to the control unit 12. The image acquisition unit 31 of the control unit 12 acquires an image of the vicinity of the display unit 13 configured on the desk captured by the imaging unit 11.

In step S202, the hand recognition unit 32 recognizes the hand image by feature information of the hand, from the image of the vicinity of the display unit 13 configured on the desk, acquired by the image acquisition unit 31. In other words, the feature information of the hand is information such as a skin color and a presence or absence of a finger and a nail, and the hand recognition unit 32 searches for a region by comparing such feature information of the hand with the image, and recognizes the searched for region as the hand image.

In step S203, the hand position detection unit 33 detects the position of the hand image recognized by the hand recognition unit 32, in the images acquired by the image acquisition unit 31, and detects the position in the image of the detected hand image as the position of the hand.

In step S204, the hand gesture recognition unit 301 recognizes a hand gesture based on the hand image. More specifically, the hand gesture recognition unit 301 recognizes the hand gesture by recognizing a change in the hand image. In other words, the hand gesture recognition unit 301 recognizes, for example, a state transition from a state in which two fingers are recognized in the hand image to a state in which one finger is recognized or vice versa as a hand gesture.

In step S204, the display control unit 302 for an operation input unit selects an operation input unit stored in association with the hand gesture recognized by the hand gesture recognition unit 301.

In step S205, the display control unit 302 for an operation input unit displays (presents) the operation input unit stored in association with the hand gesture in a position on the display unit 13 corresponding to the position of the hand detected by the hand position detection unit 33.

When the user desires to switch between a plurality of operation input units in response to a certain one of a plurality of software programs or operating systems or the like so as to be displayed through the process described above, it is possible to switch and display (present) the operation input unit simply by doing the hand gesture corresponding to the software program or the operating system desired by the user.

Note that by adding the function of the hand gesture to the process of the fourth embodiment and the fifth embodiment described above, the operation input unit may be caused to be switched and displayed according to a plurality of the software programs or the operating systems and the operation input unit may be displayed (presented) corresponding to the size, the position and the angle of the hand or the part of the hand.

In addition, since any of the configurations termed the information processing systems in the above description may be integrally incorporated, any one of the information processing systems may be considered as an information processing apparatus or an information processing terminal.

Incidentally, although the series of processes described above may also be executed by hardware, it may be executed by software. When the series of processes are executed by software, a program configuring the software is installed from the recording medium in a computer incorporated into dedicated hardware, a general-purpose personal computer capable of performing the various functions by installing various programs, or the like.

Figure 24:
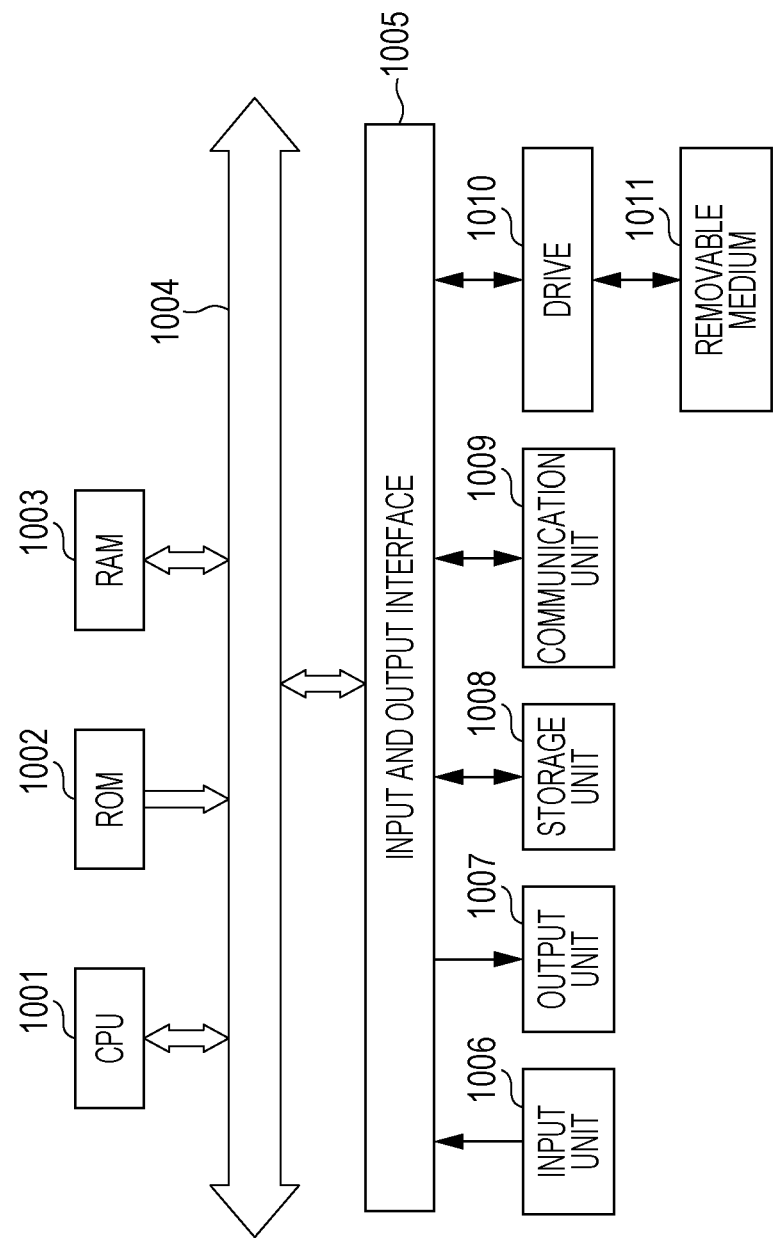
FIG. 24 is a diagram describing a configuration example of a general-purpose personal computer.

FIG. 24 shows a configuration example of a general-purpose personal computer. A Central Processing Unit (CPU) 1001 is incorporated into the personal computer. An input and output interface 1005 is connected to the CPU 1001 through a bus 1004. A Read Only Memory (ROM) 1002 and a Random Access Memory (RAM) 1003 are connected to the bus 1004.

An input unit 1006 which is an input device such as a keyboard or a mouse and through which a user inputs an operation command, an output unit 1007 which outputs a processing operation screen or an image of a process result to a display device, a storage unit 1008 made of a hard disk drive or the like which stores programs and various items of data, and a communication unit 1009 made of a Local Area Network (LAN) adapter which performs communication processes through a network such as the Internet are connected to the input and output interface 1005. Further, a magnetic disk (including a flexible disk), an optical disc (including a Compact Disc-Read Only Memory (CD-ROM) and a Digital Versatile Disc (DVD)), a magneto-optical disc (including a Mini Disc (MD)), or a drive 1010 for reading and writing data to a removable medium 1011 such as a semiconductor memory are connected to the input and output interface 1005.

The CPU 1001 executes various processes according to programs stored in the ROM 1002, and programs which are installed on the storage unit 1008 by being read from the magnetic disk, the optical disc, the magneto-optical disc, or the removable medium 1011 such as a semiconductor memory and loaded into the RAM 1003 from the storage unit 1008. Further, data required when the CPU 1001 executes various processes is suitably stored in the RAM 1003.

In the computer configured as described above, the series of processes is performed, for example, by the CPU 1001 loading onto the RAM 1003 and executing the program stored in the storage unit 1008 through the input and output interface 1005 and the bus 1004.

The program executed by a computer (CPU 1001) may be provided by being recorded on, for example, the removable medium 1011 as package media. Further, the program may be provided through a wired or wireless transmission medium such as a local area network, the Internet, and digital satellite broadcasting.

The computer may install a program in the storage unit 1008 through the input and output interface 1005 by mounting the drive 1010 in the removable medium 1011. Further, the program may be received in the communication unit 1009 through a wired or wireless transmission medium and installed in the storage unit 1008. Alternatively, the program may be installed in advance in the ROM 1002 and the storage unit 1008.

The program executed by the computer may be a program in which processes are performed in time series in the order described herein, or may be a program in which processes are performed in parallel or at necessary timing when a call is performed.

In the present specification, the system means a set of a plurality of components (devices, modules (products), and the like), and whether or not all components are in the same housing does not matter. Accordingly, any of a plurality of devices which are housed in separate housings and are connected through a network and one device in which a plurality of modules are housed in a single housing is a system.

In addition, embodiments of the present technology are not limited to the embodiments described above, and various modifications are possible without departing from the scope of the present technology.

For example, the present technology may have a configuration of cloud computing in which one function is shared and processed cooperatively by a plurality of devices through a network.

Further, the respective steps described in the flowcharts described above may be performed while being shared by a plurality of devices, in addition to being performed by one device.

Further, when a plurality of processes are included in one step, the plurality of processes included in the one step may be performed while being shared by a plurality of devices, in addition to being performed in one device.

Further, the present technology can take the following configurations.

(1)

An information processing apparatus including:

a presentation unit that presents various pieces of information;

a hand position detection unit that detects a position of a hand; and a presentation control unit for an operation input unit that presents the operation input unit within the presentation unit according to the position of the hand detected by the hand position detection unit.

(2)

The information processing apparatus according to (1), further including:

an imaging unit that captures an image; and a hand image recognition unit that recognizes a hand image including images of the hand, based on information on the image captured by the imaging unit, wherein the hand position detection unit detects the position of the hand by detecting a position of the hand image which is recognized by the hand image recognition unit, among images captured by the imaging unit.

(3)

The information processing apparatus according to (2), further including:

a hand shape pattern storage unit that stores hand shapes including shapes of a plurality of hands as hand shape patterns; and a hand shape matching degree calculation unit that calculates a hand shape matching degree between a hand shape region in which a hand shape is present among hand images which are recognized as images of the hand by the hand image recognition unit from the images and the hand shape pattern which is stored in the hand shape pattern storage unit, wherein the hand position detection unit detects the position of the hand, based on the hand shape pattern having a maximum hand shape matching degree which is calculated by the hand shape matching degree calculation unit.

(4)

The information processing apparatus according to (3), wherein when the hand shape matching degree of the position of the hand detected by the hand position detection unit is greater than a predetermined value, the presentation control unit for an operation input unit presents an operation input unit for operating with the hand, within the presentation unit according to the detected position of the hand.

(5)

The information processing apparatus according to (3), further including:

a hand shape candidate extraction unit that extracts, as a candidate, a hand shape pattern having a size substantially equal to a size of the hand shape region in which the hand shape is present, among the hand images recognized as the image of the hand by the hand image recognition unit from the images, among the hand shape patterns stored in the hand shape pattern storage unit;

a hand shape moving unit that moves the hand shape pattern extracted by the hand shape candidate extraction unit while changing a position of the hand shape pattern at a predetermined interval within the hand shape region; and a hand shape rotation unit that rotates the hand shape pattern extracted by the hand shape candidate extraction unit by a predetermined angle, wherein the hand shape matching degree calculation unit calculates the hand shape matching degree between the hand shape pattern extracted by the hand shape candidate extraction unit and the hand shape region among the hand images, while changing the hand shape pattern through moving by the hand shape moving unit and rotating by the hand shape rotation unit.

(6)

The information processing apparatus according to (3), further including:

a part shape pattern storage unit that stores part shape patterns including shapes of parts of the hand;

a part shape matching degree calculation unit that calculates a part shape matching degree between a part shape region including the shapes of parts of the hand, among images of a part of the hand which are recognized as the image of a part of the hand by the hand image recognition unit from the images, and the part shape pattern stored in the part shape pattern storage unit; and a part position detection unit that detects a position of a part of the hand based on a part shape pattern having a maximum part shape matching degree calculated by the part shape matching degree calculation unit.

(7)

The information processing apparatus according to (4), wherein when the hand shape matching degree of the position of the hand detected by the hand position detection unit is not greater than a predetermined value, if the part shape matching degree calculated by the part shape matching degree calculation unit in the position of the part shape detected by the part position detection unit is greater than a predetermined value, the presentation control unit for an operation input unit presents an operation input unit for operating with a part of the hand, within the presentation unit according to the detected position of the part shape of the hand.

(8)

The information processing apparatus according to (7), further including:

a part shape candidate extraction unit that extracts, as a candidate, a part shape pattern having a size substantially equal to a size of the part shape region in which the part shape is present, among the images of a part of the hand recognized as the image of a part of the hand by the hand image recognition unit from the images, among the part shape patterns stored in the part shape pattern storage unit;

a part shape moving unit that moves the part shape pattern extracted by the part shape candidate extraction unit while changing a position of the part shape pattern at a predetermined interval within the part shape region;

a part shape rotation unit that rotates the part shape pattern extracted by the part shape candidate extraction unit by a predetermined angle; and a part shape matching degree calculation unit that calculates a part shape matching degree between the part shape pattern extracted by the part shape candidate extraction unit and the part shape region, while changing the part shape pattern through moving by the part shape moving unit and rotating by the part shape rotation unit.

(9)

The information processing apparatus according to (6) or (7), wherein the part of the hand includes at least one of a thumb, an index finger, a middle finger, a ring finger, and a little finger.

(10)

The information processing apparatus according to (1), further including:

a hand gesture recognition unit that recognizes a gesture of the hand, wherein the presentation control unit for an operation input unit presents an operation input unit associated with the gesture, within the presentation unit according to the position of the hand detected by the hand position detection unit.

(11)

An information processing method including the steps of:

a hand position detection process of detecting a position of a hand; and a presentation control process for an operation input unit of presenting an operation input unit within a presentation unit that presents various pieces of information according to the position of the hand detected in the hand position detection process.

(12)

A program causing a computer to execute a process including:

a hand position detection step of detecting a position of a hand; and a presentation control step for an operation input unit of presenting an operation input unit within a presentation unit that presents various pieces of information according to the position of the hand detected in the hand position detection step.

REFERENCE SIGNS LIST

11 IMAGING UNIT, 12 CONTROL UNIT, 13 DISPLAY UNIT, 31 IMAGE ACQUISITION UNIT, 32 HAND RECOGNITION UNIT, 33 HAND POSITION DETECTION UNIT, 34 DISPLAY CONTROL UNIT FOR OPERATION INPUT UNIT, 51 TOUCH PANEL, 52 CONTROL UNIT, 71 DISPLAY UNIT, 72 CONTACT DETECTION UNIT, 91 CONTACT DETECTION RESULT ACQUISITION UNIT, 92 HAND RECOGNITION UNIT, 93 HAND POSITION DETECTION UNIT, 94 DISPLAY CONTROL UNIT FOR OPERATION INPUT UNIT, 101 IMAGING UNIT, 102 CONTROL UNIT, 103 PROJECTION UNIT, 104 PROJECTION PLANE, 121 IMAGE ACQUISITION UNIT, 122 HAND RECOGNITION UNIT, 123 HAND POSITION DETECTION UNIT, 124 PROJECTION CONTROL UNIT FOR OPERATION INPUT UNIT, 200 IMAGING UNIT, 201 IMAGE ACQUISITION UNIT, 202 HAND RECOGNITION UNIT, 203 HAND SHAPE PATTERN CANDIDATE EXTRACTION UNIT, 204 HAND SHAPE PATTERN STORAGE UNIT, 205 HAND SHAPE PATTERN SELECTION UNIT, 206 HAND SHAPE PATTERN MATCHING DEGREE CALCULATION UNIT, 207 HAND SHAPE PATTERN ROTATION UNIT, 208 HAND SHAPE PATTERN POSITION CHANGING UNIT, 209 HAND SIZE DETECTION UNIT, 210 HAND POSITION DETECTION UNIT, 211 DISPLAY CONTROL UNIT FOR OPERATION INPUT UNIT, 231 PART RECOGNITION UNIT, 232 PART SHAPE PATTERN CANDIDATE EXTRACTION UNIT, 233 PART SHAPE PATTERN STORAGE UNIT, 234 PART SHAPE PATTERN SELECTION UNIT, 235 PART SHAPE PATTERN MATCHING

DEGREE CALCULATION UNIT, 236 PART SHAPE PATTERN ROTATION UNIT, 237 PART SHAPE PATTERN POSITION CHANGING UNIT, 238 PART SIZE DETECTION UNIT, 239 PART POSITION DETECTION UNIT, 240 DISPLAY CONTROL UNIT FOR PART OPERATION INPUT UNIT, 301 HAND GESTURE RECOGNITION UNIT, 302 DISPLAY CONTROL UNIT FOR OPERATION INPUT UNIT

The invention claimed is:

1. An information processing apparatus comprising:
    circuitry configured to
        initiate recognition of a hand shape image corresponding to a hand,
        calculate a hand shape matching degree between the recognized hand shape image and stored hand shape patterns,
        detect a position and an angle of each part of a plurality of parts of the hand with respect to a display surface based on a position of the recognized hand image and a matching hand shape pattern of the stored hand shape patterns having a maximum calculated hand shape matching degree,
        present, when the maximum calculated hand shape matching degree is greater than a predetermined value, an operation input interface for each part of the hand including one or more operation buttons for each respective part of the hand at a plurality of positions along a respective angle on the display surface according to the detected position and the detected angle of the respective part of the hand, and
        present, when the maximum calculated hand shape matching degree is not greater than the predetermined value, an operation input interface for a selected part of the hand.

2. The information processing apparatus according to claim 1, wherein the circuitry is further configured to
    extract a candidate hand shape pattern having a size substantially equal to a size of the recognized hand image from the plurality of captured images, from among the stored hand shape patterns,
    move the extracted candidate hand shape pattern while changing a position of the extracted candidate hand shape pattern at a predetermined interval, and
    rotate the extracted candidate hand shape pattern by a predetermined angle,
    wherein the hand shape matching degree between the extracted candidate hand shape pattern and the hand shape region among the plurality of captured hand images is calculated while changing the hand shape pattern and rotating the extracted candidate hand shape pattern.

3. The information processing apparatus according to claim 1, wherein the circuitry is further configured to
    initiate a storing of part shape patterns including shapes of the plurality of parts of the hand based on the recognized hand image,
    calculate a part shape matching degree between each part of the plurality of parts of the hand based on the recognized hand image, among images of the part of the hand which are recognized as the image of the part of the hand from the images, and the stored part shape pattern, and
    detect a position of each part of the hand based on a stored part shape pattern having a maximum calculated part shape matching degree.

4. The information processing apparatus according to claim 3,
    wherein, if the maximum calculated part shape matching degree in the position of the detected part shape is greater than a predetermined value, the circuitry presents the operation input interface for operating with the selected part of the hand having the maximum calculated part shape matching degree among the plurality of parts of the hand, according to the detected position of the selected part of the hand.

5. The information processing apparatus according to claim 4, wherein the circuitry is further configured to
    extract a candidate part shape pattern having a size substantially equal to a size of the part of the hand recognized as the image of a part of the hand from the plurality of captured images, among the stored part shape patterns,
    move the extracted candidate part shape pattern while changing a position of the extracted candidate part shape pattern at a predetermined interval,
    rotate the extracted candidate part shape pattern by a predetermined angle, and
    calculate the part shape matching degree between the extracted candidate part shape pattern and the part shape region, while changing the part shape pattern through moving and rotating the extracted candidate part shape pattern.

6. The information processing apparatus according to claim 3,
    wherein the part of the hand includes at least one of a thumb, an index finger, a middle finger, a ring finger, and a little finger.

7. The information processing apparatus according to claim 1,
    wherein the circuitry is further configured to recognize a gesture of the hand,
    wherein the operation input interface is presented based on the recognized gesture, and according to the position of the hand detected throughout the recognized gesture.

8. An information processing method, performed via at least one processor, the method comprising:
    initiating recognition of a hand shape image corresponding to a hand,
    calculating a hand shape matching degree between the recognized hand shape image and stored hand shape patterns,
    detecting a position and an angle of each part of a plurality of parts of the hand with respect to a display surface based on a position of the recognized hand image and a matching hand shape pattern of the stored hand shape patterns having a maximum calculated hand shape matching degree;
    presenting, when the maximum calculated hand shape matching degree is greater than a predetermined value, an operation input interface for each part of the hand including one or more operation buttons for each respective part of the hand at a plurality of positions along a respective angle on the display surface according to the detected position and the detected angle of the respective part of the hand; and
    presenting, when the maximum calculated hand shape matching degree is not greater than the predetermined value, an operation input interface for a selected part of the hand.

9. A non-transitory computer-readable storage medium having embodied thereon a program, which when executed by a computer causes the computer to execute a process, the process comprising: initiating recognition of a hand shape image corresponding to a hand, calculating a hand shape matching degree between the recognized hand shape image and stored hand shape patterns, detecting a position and an angle of each part of a plurality of parts of the hand with respect to a display surface based on a position of the recognized hand image and a matching hand shape pattern of the stored hand shape patterns having a maximum calculated hand shape matching degree; presenting, when the maximum calculated hand shape matching degree is greater than a predetermined value, an operation input interface for each part of the hand including one or more operation buttons for each respective part of the hand at a plurality of positions along a respective angle on the display surface according to the detected position and the detected angle of the respective part of the hand; and presenting, when the maximum calculated hand shape matching degree is not greater than the predetermined value, an operation input interface for a selected part of the hand.

* * * * *